US006847389B2

(12) United States Patent
Shiraishi

(10) Patent No.: US 6,847,389 B2
(45) Date of Patent: Jan. 25, 2005

(54) OPTICAL BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/428,031

(22) Filed: May 2, 2003

(65) Prior Publication Data

US 2004/0218029 A1 Nov. 4, 2004

(51) Int. Cl.[7] .............................. B41J 2/385
(52) U.S. Cl. .................. 347/134; 358/474; 358/480; 359/204; 359/223; 359/226; 359/301
(58) Field of Search ................. 347/129, 134, 347/137; 358/479, 480, 481, 494, 497; 359/196, 204–207, 223, 226, 307

(56) References Cited

U.S. PATENT DOCUMENTS

| 5,194,981 A | * | 3/1993 | Morimoto ............... 359/212 |
| 5,596,424 A | * | 1/1997 | Iizuka et al. ............ 358/474 |
| 5,790,275 A | * | 8/1998 | Iizuka .................... 358/474 |
| 6,418,095 B1 | * | 7/2002 | Sano et al. ............. 369/44.32 |
| 2003/0071216 A1 | * | 4/2003 | Rabolt ................... 250/339.02 |

FOREIGN PATENT DOCUMENTS

| JP | 5-19191 A | 1/1993 |
| JP | 5-19192 A | 1/1993 |
| JP | 6-148547 A | 5/1994 |
| JP | 7-253554 A | 3/1995 |
| JP | 9-258127 A | 10/1997 |
| JP | 9-288244 A | 11/1997 |
| JP | 10-58738 A | 3/1998 |
| JP | 10-325933 A | 12/1998 |
| JP | 11-242175 A | 9/1999 |
| JP | 11-326807 A | 11/1999 |
| JP | 2000-267034 A | 9/2000 |
| JP | 2001-091873 A | 4/2001 |
| JP | 2001-100129 A | 4/2001 |
| JP | 2001-215427 A | 8/2001 |

* cited by examiner

Primary Examiner—Eugene H. Eickholt
(74) Attorney, Agent, or Firm—Foley & Lardner LLP

(57) ABSTRACT

The present invention provides an optical beam scanning device and an image forming apparatus capable of restraining the light amount irregularity in the main scanning direction in the image plane.

An optical beam scanning device of the present invention is for having a light beam with the width in the main scanning direction wider than the width in the main scanning direction of the reflection surface of a deflector incident on the deflector, reflecting and polarizing a part thereof by the reflection surface of the deflector, and focusing the polarized light beam on a surface to be scanned by optical means including a transmission type optical member. Then, the polarization direction of the light beam incident on the deflector is substantially in the main scanning direction. According to an image forming apparatus comprising a plurality of light sources for forming a plurality of scanning lines with the light beams from a plurality of the light sources, the polarization direction of the light beams from the light sources at the time of being incident on the corresponding deflector is provided substantially in the main scanning direction.

13 Claims, 22 Drawing Sheets

Fig.8

| NN \ m | 0 | 1 | 2 | 3 | 4 | 5 | 6 | 7 |
|---|---|---|---|---|---|---|---|---|
| 12 | 1.000 | 1.029 | 1.059 | 1.090 | 1.122 | 1.155 | 1.189 | 1.224 |
| 13 | 1.000 | 1.025 | 1.051 | 1.077 | 1.104 | 1.131 | 1.159 | 1.188 |
| 14 | 1.000 | 1.022 | 1.043 | 1.066 | 1.089 | 1.112 | 1.136 | 1.161 |
| 15 | 1.000 | 1.019 | 1.038 | 1.057 | 1.077 | 1.097 | 1.118 | 1.139 |
| 16 | 1.000 | 1.016 | 1.033 | 1.050 | 1.067 | 1.085 | 1.103 | 1.121 |
| 17 | 1.000 | 1.015 | 1.029 | 1.044 | 1.059 | 1.075 | 1.090 | 1.106 |
| 18 | 1.000 | 1.013 | 1.026 | 1.039 | 1.053 | 1.066 | 1.080 | 1.094 |
| 19 | 1.000 | 1.012 | 1.023 | 1.035 | 1.047 | 1.059 | 1.072 | 1.084 |
| 20 | 1.000 | 1.010 | 1.021 | 1.032 | 1.043 | 1.053 | 1.065 | 1.076 |
| 21 | 1.000 | 1.009 | 1.019 | 1.029 | 1.039 | 1.048 | 1.058 | 1.068 |
| 22 | 1.000 | 1.009 | 1.017 | 1.026 | 1.035 | 1.044 | 1.053 | 1.062 |

Fig.9

| NN \ m | 0 | 1 | 2 | 3 | 4 | 5 | 6 | 7 |
|---|---|---|---|---|---|---|---|---|
| 12 | 0.20 | 0.24 | 0.28 | 0.32 | 0.36 | 0.41 | – | – |
| 13 | 0.21 | 0.24 | 0.28 | 0.31 | 0.34 | 0.38 | 0.42 | – |
| 14 | 0.21 | 0.24 | 0.27 | 0.30 | 0.33 | 0.36 | 0.39 | 0.43 |
| 15 | 0.22 | 0.24 | 0.27 | 0.29 | 0.32 | 0.34 | 0.37 | 0.40 |
| 16 | 0.22 | 0.24 | 0.26 | 0.29 | 0.31 | 0.33 | 0.35 | 0.37 |
| 17 | 0.22 | 0.24 | 0.26 | 0.28 | 0.30 | 0.32 | 0.34 | 0.36 |
| 18 | 0.23 | 0.24 | 0.26 | 0.28 | 0.29 | 0.31 | 0.32 | 0.34 |
| 19 | 0.23 | 0.24 | 0.26 | 0.27 | 0.29 | 0.30 | 0.32 | 0.33 |
| 20 | 0.23 | 0.24 | 0.26 | 0.27 | 0.28 | 0.30 | 0.31 | 0.32 |
| 21 | 0.23 | 0.24 | 0.25 | 0.27 | 0.28 | 0.29 | 0.30 | 0.31 |
| 22 | 0.23 | 0.24 | 0.25 | 0.26 | 0.27 | 0.29 | 0.30 | 0.31 |

Fig.10

| NN \ m | 0 | 1 | 2 | 3 | 4 | 5 | 6 | 7 |
|---|---|---|---|---|---|---|---|---|
| 12 | 0.900 | 0.873 | 0.847 | 0.819 | 0.790 | 0.756 | – | – |
| 13 | 0.899 | 0.877 | 0.854 | 0.831 | 0.807 | 0.780 | 0.747 | – |
| 14 | 0.899 | 0.880 | 0.860 | 0.840 | 0.820 | 0.798 | 0.773 | 0.741 |
| 15 | 0.899 | 0.882 | 0.865 | 0.848 | 0.830 | 0.811 | 0.792 | 0.769 |
| 16 | 0.899 | 0.884 | 0.869 | 0.854 | 0.838 | 0.822 | 0.806 | 0.788 |
| 17 | 0.899 | 0.886 | 0.872 | 0.859 | 0.845 | 0.831 | 0.817 | 0.801 |
| 18 | 0.899 | 0.887 | 0.875 | 0.863 | 0.851 | 0.838 | 0.826 | 0.813 |
| 19 | 0.899 | 0.888 | 0.878 | 0.867 | 0.856 | 0.845 | 0.833 | 0.822 |
| 20 | 0.899 | 0.889 | 0.880 | 0.870 | 0.860 | 0.850 | 0.840 | 0.830 |
| 21 | 0.899 | 0.890 | 0.881 | 0.872 | 0.864 | 0.855 | 0.845 | 0.836 |
| 22 | 0.899 | 0.891 | 0.883 | 0.875 | 0.867 | 0.858 | 0.850 | 0.842 |

Fig.11

| NN \ m | 0 | 1 | 2 | 3 | 4 | 5 | 6 | 7 |
|---|---|---|---|---|---|---|---|---|
| 12 | 0.90 | 0.90 | 0.90 | 0.89 | 0.89 | 0.87 | – | – |
| 13 | 0.90 | 0.90 | 0.90 | 0.89 | 0.89 | 0.88 | 0.87 | – |
| 14 | 0.90 | 0.90 | 0.90 | 0.90 | 0.89 | 0.89 | 0.88 | 0.86 |
| 15 | 0.90 | 0.90 | 0.90 | 0.90 | 0.89 | 0.89 | 0.88 | 0.88 |
| 16 | 0.90 | 0.90 | 0.90 | 0.90 | 0.89 | 0.89 | 0.89 | 0.88 |
| 17 | 0.90 | 0.90 | 0.90 | 0.90 | 0.90 | 0.89 | 0.89 | 0.89 |
| 18 | 0.90 | 0.90 | 0.90 | 0.90 | 0.90 | 0.89 | 0.89 | 0.89 |
| 19 | 0.90 | 0.90 | 0.90 | 0.90 | 0.90 | 0.89 | 0.89 | 0.89 |
| 20 | 0.90 | 0.90 | 0.90 | 0.90 | 0.90 | 0.90 | 0.89 | 0.89 |
| 21 | 0.90 | 0.90 | 0.90 | 0.90 | 0.90 | 0.90 | 0.89 | 0.89 |
| 22 | 0.90 | 0.90 | 0.90 | 0.90 | 0.90 | 0.90 | 0.90 | 0.89 |

Fig.12

| NN \ m | 0 | 1 | 2 | 3 | 4 | 5 | 6 | 7 |
|---|---|---|---|---|---|---|---|---|
| 12 | – | – | – | – | – | 0.09 | 0.16 | 0.21 |
| 13 | – | – | – | – | – | – | 0.11 | 0.16 |
| 14 | – | – | – | – | – | – | 0.06 | 0.12 |
| 15 | – | – | – | – | – | – | – | 0.08 |
| 16 | – | – | – | – | – | – | – | – |
| 17 | – | – | – | – | – | – | – | – |
| 18 | – | – | – | – | – | – | – | – |
| 19 | – | – | – | – | – | – | – | – |
| 20 | – | – | – | – | – | – | – | – |
| 21 | – | – | – | – | – | – | – | – |
| 22 | – | – | – | – | – | – | – | – |

Fig.13

| NN \ m | 0 | 1 | 2 | 3 | 4 | 5 | 6 | 7 |
|---|---|---|---|---|---|---|---|---|
| 12 | – | – | – | – | – | 0.952 | 0.925 | 0.898 |
| 13 | – | – | – | – | – | – | 0.949 | 0.926 |
| 14 | – | – | – | – | – | – | 0.968 | 0.948 |
| 15 | – | – | – | – | – | – | – | 0.966 |
| 16 | – | – | – | – | – | – | – | – |
| 17 | – | – | – | – | – | – | – | – |
| 18 | – | – | – | – | – | – | – | – |
| 19 | – | – | – | – | – | – | – | – |
| 20 | – | – | – | – | – | – | – | – |
| 21 | – | – | – | – | – | – | – | – |
| 22 | – | – | – | – | – | – | – | – |

Fig.14

| NN\m | 0 | 1 | 2 | 3 | 4 | 5 | 6 | 7 |
|---|---|---|---|---|---|---|---|---|
| 12 | – | – | – | – | – | 1.10 | 1.10 | 1.10 |
| 13 | – | – | – | – | – | – | 1.10 | 1.10 |
| 14 | – | – | – | – | – | – | 1.10 | 1.10 |
| 15 | – | – | – | – | – | – | – | 1.10 |
| 16 | – | – | – | – | – | – | – | – |
| 17 | – | – | – | – | – | – | – | – |
| 18 | – | – | – | – | – | – | – | – |
| 19 | – | – | – | – | – | – | – | – |
| 20 | – | – | – | – | – | – | – | – |
| 21 | – | – | – | – | – | – | – | – |
| 22 | – | – | – | – | – | – | – | – |

Fig.15

| NN\m | 0 | 1 | 2 | 3 | 4 | 5 | 6 | 7 |
|---|---|---|---|---|---|---|---|---|
| 12 | 0.10 | 0.16 | 0.21 | 0.25 | 0.29 | 0.33 | 0.37 | 0.42 |
| 13 | 0.11 | 0.16 | 0.20 | 0.24 | 0.27 | 0.30 | 0.33 | 0.37 |
| 14 | 0.12 | 0.16 | 0.20 | 0.23 | 0.26 | 0.28 | 0.31 | 0.34 |
| 15 | 0.13 | 0.16 | 0.19 | 0.22 | 0.25 | 0.27 | 0.29 | 0.32 |
| 16 | 0.13 | 0.16 | 0.19 | 0.21 | 0.24 | 0.26 | 0.28 | 0.30 |
| 17 | 0.14 | 0.16 | 0.19 | 0.21 | 0.23 | 0.25 | 0.27 | 0.28 |
| 18 | 0.14 | 0.16 | 0.18 | 0.20 | 0.22 | 0.24 | 0.26 | 0.27 |
| 19 | 0.14 | 0.16 | 0.18 | 0.20 | 0.22 | 0.23 | 0.25 | 0.26 |
| 20 | 0.14 | 0.16 | 0.18 | 0.20 | 0.21 | 0.23 | 0.24 | 0.25 |
| 21 | 0.15 | 0.16 | 0.18 | 0.19 | 0.21 | 0.22 | 0.23 | 0.25 |
| 22 | 0.15 | 0.16 | 0.18 | 0.19 | 0.20 | 0.22 | 0.23 | 0.24 |

Fig.16

| NN \ m | 0 | 1 | 2 | 3 | 4 | 5 | 6 | 7 |
|---|---|---|---|---|---|---|---|---|
| 12 | 0.950 | 0.923 | 0.896 | 0.870 | 0.843 | 0.816 | 0.786 | 0.751 |
| 13 | 0.950 | 0.927 | 0.904 | 0.881 | 0.859 | 0.835 | 0.812 | 0.786 |
| 14 | 0.950 | 0.930 | 0.910 | 0.890 | 0.871 | 0.851 | 0.831 | 0.810 |
| 15 | 0.950 | 0.932 | 0.915 | 0.898 | 0.881 | 0.864 | 0.846 | 0.828 |
| 16 | 0.950 | 0.935 | 0.919 | 0.904 | 0.889 | 0.874 | 0.859 | 0.843 |
| 17 | 0.950 | 0.936 | 0.923 | 0.909 | 0.896 | 0.882 | 0.869 | 0.855 |
| 18 | 0.950 | 0.938 | 0.926 | 0.914 | 0.902 | 0.890 | 0.878 | 0.865 |
| 19 | 0.950 | 0.939 | 0.928 | 0.917 | 0.906 | 0.896 | 0.885 | 0.874 |
| 20 | 0.950 | 0.940 | 0.930 | 0.920 | 0.911 | 0.901 | 0.891 | 0.881 |
| 21 | 0.950 | 0.941 | 0.932 | 0.923 | 0.914 | 0.905 | 0.897 | 0.888 |
| 22 | 0.950 | 0.942 | 0.934 | 0.925 | 0.917 | 0.909 | 0.901 | 0.893 |

Fig.17

| NN \ m | 0 | 1 | 2 | 3 | 4 | 5 | 6 | 7 |
|---|---|---|---|---|---|---|---|---|
| 12 | 0.95 | 0.95 | 0.95 | 0.95 | 0.95 | 0.94 | 0.94 | 0.92 |
| 13 | 0.95 | 0.95 | 0.95 | 0.95 | 0.95 | 0.95 | 0.94 | 0.93 |
| 14 | 0.95 | 0.95 | 0.95 | 0.95 | 0.95 | 0.95 | 0.94 | 0.94 |
| 15 | 0.95 | 0.95 | 0.95 | 0.95 | 0.95 | 0.95 | 0.95 | 0.94 |
| 16 | 0.95 | 0.95 | 0.95 | 0.95 | 0.95 | 0.95 | 0.95 | 0.95 |
| 17 | 0.95 | 0.95 | 0.95 | 0.95 | 0.95 | 0.95 | 0.95 | 0.95 |
| 18 | 0.95 | 0.95 | 0.95 | 0.95 | 0.95 | 0.95 | 0.95 | 0.95 |
| 19 | 0.95 | 0.95 | 0.95 | 0.95 | 0.95 | 0.95 | 0.95 | 0.95 |
| 20 | 0.95 | 0.95 | 0.95 | 0.95 | 0.95 | 0.95 | 0.95 | 0.95 |
| 21 | 0.95 | 0.95 | 0.95 | 0.95 | 0.95 | 0.95 | 0.95 | 0.95 |
| 22 | 0.95 | 0.95 | 0.95 | 0.95 | 0.95 | 0.95 | 0.95 | 0.95 |

Fig.18

| NN \ m | 0 | 1 | 2 | 3 | 4 | 5 | 6 | 7 |
|---|---|---|---|---|---|---|---|---|
| 12 | – | – | – | 0.04 | 0.13 | 0.19 | 0.23 | 0.27 |
| 13 | – | – | – | – | 0.11 | 0.16 | 0.20 | 0.24 |
| 14 | – | – | – | – | 0.08 | 0.13 | 0.17 | 0.21 |
| 15 | – | – | – | – | 0.04 | 0.11 | 0.15 | 0.18 |
| 16 | – | – | – | – | – | 0.08 | 0.13 | 0.16 |
| 17 | – | – | – | – | – | 0.06 | 0.10 | 0.14 |
| 18 | – | – | – | – | – | 0.01 | 0.08 | 0.12 |
| 19 | – | – | – | – | – | – | 0.06 | 0.10 |
| 20 | – | – | – | – | – | – | 0.03 | 0.08 |
| 21 | – | – | – | – | – | – | – | 0.06 |
| 22 | – | – | – | – | – | – | – | 0.03 |

Fig.19

| NN \ m | 0 | 1 | 2 | 3 | 4 | 5 | 6 | 7 |
|---|---|---|---|---|---|---|---|---|
| 12 | – | – | – | 0.963 | 0.935 | 0.909 | 0.882 | 0.856 |
| 13 | – | – | – | – | 0.951 | 0.928 | 0.905 | 0.883 |
| 14 | – | – | – | – | 0.964 | 0.944 | 0.924 | 0.904 |
| 15 | – | – | – | – | 0.975 | 0.957 | 0.939 | 0.922 |
| 16 | – | – | – | – | – | 0.968 | 0.952 | 0.937 |
| 17 | – | – | – | – | – | 0.977 | 0.963 | 0.949 |
| 18 | – | – | – | – | – | 0.985 | 0.972 | 0.960 |
| 19 | – | – | – | – | – | – | 0.980 | 0.968 |
| 20 | – | – | – | – | – | – | 0.986 | 0.976 |
| 21 | – | – | – | – | – | – | – | 0.983 |
| 22 | – | – | – | – | – | – | – | 0.989 |

Fig.20

| NN\m | 0 | 1 | 2 | 3 | 4 | 5 | 6 | 7 |
|---|---|---|---|---|---|---|---|---|
| 12 | – | – | – | 1.05 | 1.05 | 1.05 | 1.05 | 1.05 |
| 13 | – | – | – | – | 1.05 | 1.05 | 1.05 | 1.05 |
| 14 | – | – | – | – | 1.05 | 1.05 | 1.05 | 1.05 |
| 15 | – | – | – | – | 1.05 | 1.05 | 1.05 | 1.05 |
| 16 | – | – | – | – | – | 1.05 | 1.05 | 1.05 |
| 17 | – | – | – | – | – | 1.05 | 1.05 | 1.05 |
| 18 | – | – | – | – | – | 1.05 | 1.05 | 1.05 |
| 19 | – | – | – | – | – | – | 1.05 | 1.05 |
| 20 | – | – | – | – | – | – | 1.05 | 1.05 |
| 21 | – | – | – | – | – | – | – | 1.05 |
| 22 | – | – | – | – | – | – | – | 1.05 |

Fig.21

| NN\m | 0 | 1 | 2 | 3 | 4 | 5 | 6 | 7 |
|---|---|---|---|---|---|---|---|---|
| 12 | – | – | 0.11 | 0.17 | 0.22 | 0.26 | 0.30 | 0.33 |
| 13 | – | – | 0.10 | 0.16 | 0.20 | 0.23 | 0.27 | 0.30 |
| 14 | – | – | 0.10 | 0.15 | 0.18 | 0.22 | 0.24 | 0.27 |
| 15 | – | – | 0.09 | 0.14 | 0.17 | 0.20 | 0.23 | 0.25 |
| 16 | – | – | 0.08 | 0.13 | 0.16 | 0.19 | 0.21 | 0.23 |
| 17 | – | – | 0.08 | 0.12 | 0.15 | 0.17 | 0.20 | 0.22 |
| 18 | – | – | 0.07 | 0.11 | 0.14 | 0.16 | 0.18 | 0.20 |
| 19 | – | – | 0.07 | 0.10 | 0.13 | 0.15 | 0.17 | 0.19 |
| 20 | – | – | 0.07 | 0.10 | 0.12 | 0.15 | 0.16 | 0.18 |
| 21 | – | – | 0.06 | 0.09 | 0.12 | 0.14 | 0.16 | 0.17 |
| 22 | – | – | 0.06 | 0.09 | 0.11 | 0.13 | 0.15 | 0.16 |

Fig.22

| NN \ m | 0 | 1 | 2 | 3 | 4 | 5 | 6 | 7 |
|---|---|---|---|---|---|---|---|---|
| 12 | – | – | 0.944 | 0.917 | 0.890 | 0.864 | 0.837 | 0.810 |
| 13 | – | – | 0.952 | 0.929 | 0.906 | 0.883 | 0.860 | 0.837 |
| 14 | – | – | 0.958 | 0.938 | 0.918 | 0.898 | 0.879 | 0.859 |
| 15 | – | – | 0.964 | 0.946 | 0.928 | 0.911 | 0.894 | 0.877 |
| 16 | – | – | 0.968 | 0.952 | 0.937 | 0.921 | 0.906 | 0.891 |
| 17 | – | – | 0.972 | 0.958 | 0.944 | 0.930 | 0.917 | 0.903 |
| 18 | – | – | 0.975 | 0.962 | 0.950 | 0.938 | 0.925 | 0.913 |
| 19 | – | – | 0.977 | 0.966 | 0.955 | 0.944 | 0.933 | 0.922 |
| 20 | – | – | 0.979 | 0.969 | 0.959 | 0.949 | 0.939 | 0.929 |
| 21 | – | – | 0.981 | 0.972 | 0.963 | 0.954 | 0.945 | 0.936 |
| 22 | – | – | 0.983 | 0.974 | 0.966 | 0.958 | 0.950 | 0.941 |

Fig.23

| NN \ m | 0 | 1 | 2 | 3 | 4 | 5 | 6 | 7 |
|---|---|---|---|---|---|---|---|---|
| 12 | – | – | 1.00 | 1.00 | 1.00 | 1.00 | 1.00 | 0.99 |
| 13 | – | – | 1.00 | 1.00 | 1.00 | 1.00 | 1.00 | 1.00 |
| 14 | – | – | 1.00 | 1.00 | 1.00 | 1.00 | 1.00 | 1.00 |
| 15 | – | – | 1.00 | 1.00 | 1.00 | 1.00 | 1.00 | 1.00 |
| 16 | – | – | 1.00 | 1.00 | 1.00 | 1.00 | 1.00 | 1.00 |
| 17 | – | – | 1.00 | 1.00 | 1.00 | 1.00 | 1.00 | 1.00 |
| 18 | – | – | 1.00 | 1.00 | 1.00 | 1.00 | 1.00 | 1.00 |
| 19 | – | – | 1.00 | 1.00 | 1.00 | 1.00 | 1.00 | 1.00 |
| 20 | – | – | 1.00 | 1.00 | 1.00 | 1.00 | 1.00 | 1.00 |
| 21 | – | – | 1.00 | 1.00 | 1.00 | 1.00 | 1.00 | 1.00 |
| 22 | – | – | 1.00 | 1.00 | 1.00 | 1.00 | 1.00 | 1.00 |

6 DIAPHRAGM IN SUB SCANNING DIRECTION

6 DIAPHRAGM IN SUB SCANNING DIRECTION

14 HALF WAVE PLATE

Fig.35
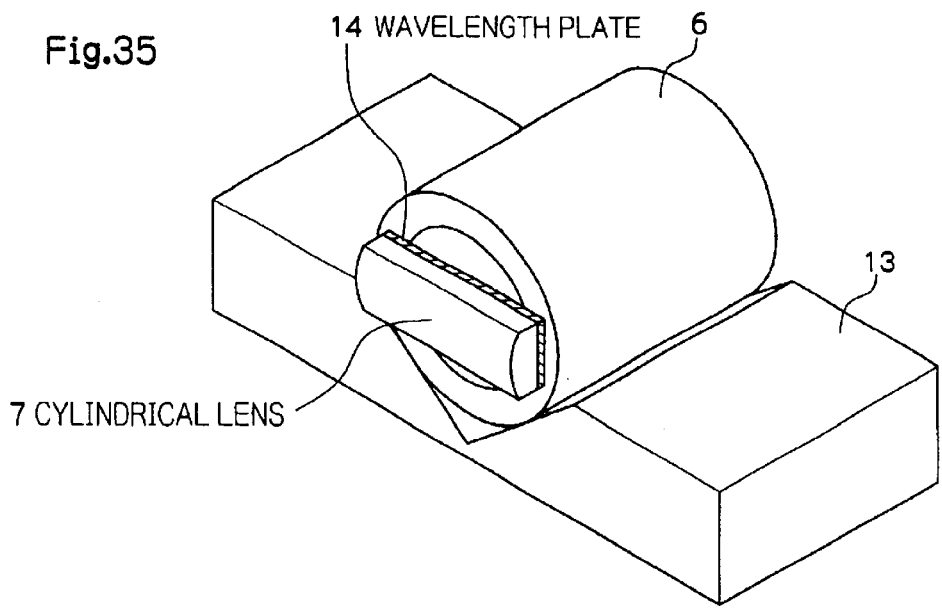
Fig.36A  MAIN SCANNING DIRECTION  Fig.36B
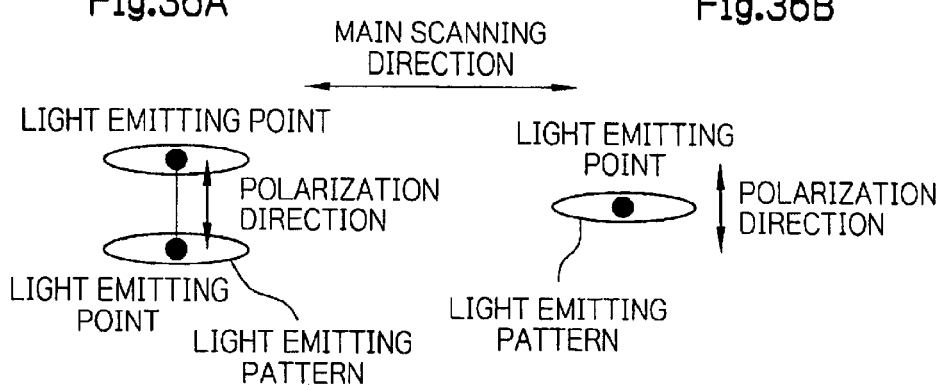
Fig.37A  POLARIZATION DIRECTION  Fig.37B
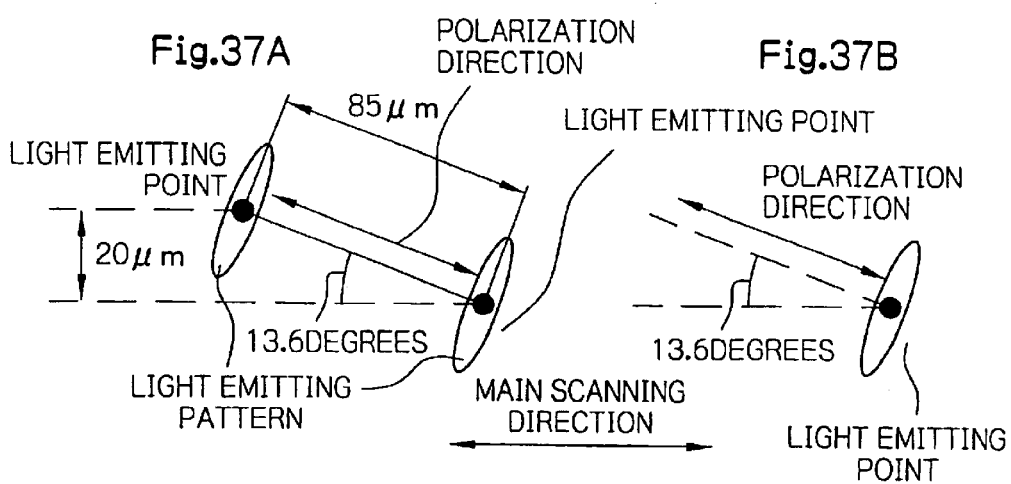

OPTICAL BEAM SCANNING DEVICE AND IMAGE FORMING APPARATUS

BACKGROUND OF THE INVENTION

1. Field of the Invention

The present invention relates to an image forming apparatus such as a laser printer, and a digital copying machine, and an optical beam scanning device to be used for an image forming apparatus.

2. Description of the Related Art

Conventionally, the optical beam scanning device has been applied widely as for example an optical system for supplying a laser beam to an image forming section for forming a latent image on a photosensitive member based on image data in an image forming apparatus such as a laser printer and a digital copying machine.

Such an optical beam scanning device comprises a semiconductor laser element (laser diode) as a light source, a (light sources side) pre-deflection optical system for narrowing the cross-sectional shape of a laser beam output from the laser diode or the like to a predetermined size, a scanning optical system for deflecting the narrowed laser beam by a rotatable polygon mirror in the photosensitive member (photosensitive drum) rotation axis direction, that is, in the main scanning direction, an (image plane side) post-deflection optical system for focusing the deflected laser beam substantially equally at any position along the main scanning direction of the image plane of the photosensitive member, or the like. The direction orthogonal to the main scanning direction of the image plane is defined to be the sub scanning direction.

According to the optical beam scanning device, it is desirable to restrain irregularity of the light amount reaching onto the image plane of the photosensitive member to a small degree. Conventionally, various methods for restraining the irregularity of the light amount to a small degree have been proposed.

As a kind of the method for restraining the irregularity of the light amount to a small degree, there is a method of utilizing the laser beam polarization direction. As a specific method thereof, there is a method of providing the polarization direction between a P polarized light beam and an S polarized light beam, or as a circularly polarized light beam.

For example, the method disclosed in the official gazette of the Japanese Patent Application Laid-Open (JP-A) No. 2001-91873 is as follows. That is, the angle θ formed by the polarization direction of the diverging light from the laser diode and the direction perpendicular to the reflection surface of the rotatable polygon mirror is provided as $10° \leq \theta \leq 80°$.

However, according to the method of providing the polarization direction between a P polarized light beam and an S polarized light beam, or as a circularly polarized light beam, since the phase difference is generated by the P wave component and the S wave component, depending on the incident angle in the case the laser beam polarization direction is incident on the metal rotatable polygon mirror surface, an elliptical polarization with the major axis direction (angle) changed according to the angle change of the rotatable polygon mirror is provided. Therefore, it is difficult to constantly maintain the light amount. Moreover, according to an ordinary lens, the birefringence with the refractive index provided differently depending on the polarization direction is generated due to the influence such as an internal distortion at the time of shaping, processing, or the like. In the case the polarization direction is changed, the light focusing position, or the like is changed as well so that the image forming characteristic is deteriorated as a result, and thus a problem is involved in that the beam cannot be focused, flare is increased, or the like.

One with an adjustable polarization direction has been proposed as well. However, an adjusting mechanism is needed so as to give rise to cost increase, such as the need of the steps for adjustment. Moreover, in general, the beam divergence angle of the laser diode differs depending on the direction, and thus an elliptical beam is provided. Therefore, in the case the laser diode angle itself is rotated around the optical axis, the beam size on the surface to be scanned itself is influenced.

Furthermore, in the case light beams from a plurality of light sources are utilized like in a color image forming apparatus, not only the light amount irregularity of the scanning lines should be restrained but also the light amounts in the scanning lines should be equal. However, as a conventional method, a method of utilizing semiconductor lasers of the same characteristic, or the like has been provided, and the apparatus range with the method usable has been limited.

SUMMARY OF THE INVENTION

An object of the present invention is to provide an optical beam scanning device capable of restraining the light amount irregularity in the main scanning direction in the image plane.

Moreover, a not her object of the pre sent invention is to restrain the light amount irregularity of each scanning line in the image plane and provide the light amount ratio of each scanning line equally regardless of the position in the main scanning direction in an image forming apparatus utilizing light beams from a plurality of light sources.

An optical beam scanning device of a first aspect of the present invention is for having a light beam with the width in the main scanning direction wider than the width in the main scanning direction of the reflection surface of a deflector incident on the deflector, reflecting and deflecting a part thereof by the reflection surface of the deflector, and focusing the deflected light beam on a surface to be scanned by an optical means including a transmission type optical member. Then, the polarization direction of the light beam incident on the deflector is substantially in the main scanning direction.

The ratio of the output light amount with respect to the incident light amount in a deflector becomes smaller as the polygon mirror angle (angle between optical axis of the post-deflection optical system and normal line of the polygon mirror surface) with the deflection becomes larger. In contrast, in the transmission type optical member for having the light beam after the deflection passing through, according to the P polarization component with the deflection direction identical to the main scanning direction, the transmissivity is higher with a larger deflection polygon mirror angle, and according to the S polarization component with the deflection direction orthogonal to the main scanning direction, the transmissivity is lower with a higher polygon mirror angle. Therefore, the light amount irregularity in the main scanning direction by the reflection by the deflector can be offset by having the polarization direction of the incident light beam on the transmission type optical member in substantially main scanning direction (P polarized light beam) so that the light amount irregularity in the image plane can be restrained. The first aspect of the invention has been achieved based on such idea.

An optical bean scanning device of a second aspect of the present invention comprises an optical element for converting an output light beam from a light source to a parallel light beam or a light flux close to a parallel light beam, a cylindrical lens with a plane provided on the incident side, for focusing the output light beam from the optical element in the vicinity of the deflector in the sub scanning direction, and a half wave plate, or a birefringence substance to provide the function of a half wave plate, provided in the plane of the cylindrical lens.

Since the polarization direction of the output light beam from the light source is in the sub scanning direction, and the light beam passes through the half wave plate or the birefringence substance to provide the function of the half wave plate, the polarization direction of the light beam incident on the deflector is substantially in the main scanning direction. As a result, the light amount irregularity in the image plane can be restrained as in the optical beam scanning device of the first aspect of the present invention.

An image forming apparatus of a third aspect of the present invention comprises a plurality of optical beam scanning devices for forming a scanning line, utilizing a deflector, or an optical beam scanning device with a deflector utilized commonly by a plurality of scanning light beams, for forming a plurality of scanning lines by light beams from a plurality of light sources. Then, a light beam having a width wider in the main scanning direction than the width of the reflection surface of the deflector in the main scanning direction is incident on the deflector, and the polarization direction of the output light beams from the light sources at the time of being incident on the deflector is substantially in the main scanning direction.

Since the scanning lines of the light beams from the light sources each have the polarization direction at the time of being incident on the deflector being substantially in the main scanning direction, the light amount irregularity in the image plane can be restrained for the reason explained for the first aspect of the present invention. As a result, the light amount ratio between the scanning lines of the light beams from the light sources can be stabilized regardless of the position in the main scanning direction so that a preferable image can be formed even in the case of having a plurality of the light sources.

An image forming apparatus of a fourth aspect of the present invention comprises a plurality of optical beam scanning devices for forming a scanning line, utilizing a deflector, or an optical beam scanning device with a deflector utilized commonly by a plurality of scanning light beams, for forming a plurality of scanning lines by light beams from a plurality of light sources. Then, at least one of a plurality of the light sources comprises a plurality of semiconductor lasers having different number of light emitting points so that the absolute values of the angles with respect to the main scanning direction of the polarization direction of the corresponding light beams incident on the deflector are same.

Since the absolute values of the angles with respect to the main scanning direction of polarization direction of the corresponding light beams from the semiconductor laser incident on the deflector are same, the P polarization component of the light beams incident on the deflector are substantially the same regardless of the light sources so that by having the P polarization component larger than the S polarization component, the light amount irregularity in the image plane in the scanning lines can be restrained for the reason explained for the first aspect of the present invention. Moreover, the light amount ratio between the scanning lines of the light beams from the light sources can be stabilized regardless of the position in the main scanning direction so that a preferable image can be formed.

An optical beam scanning device of a fifth aspect of the present invention comprises an optical element for converting an output light beam from a light source to a parallel light beam or a light flux close to a parallel light beam, a cylindrical lens with a plane provided on the incident side, for focusing the output light beam from the optical element in the vicinity of the deflector in the sub scanning direction, and a wave plate, or a birefringence substance to provide the function of a wave plate, provided in the plane of the cylindrical lens, wherein the cylindrical lens is provided rotatably around the optical axis of the light beam passage as the rotation center.

Since the polarization direction of the light beam output from the light source is in the sub scanning direction and the light beam passes through the wave plate or the birefringence substance to provide the function of a wave plate, the polarization direction of the light beam incident on the deflector can be in the substantially main scanning direction. As a result, the light amount irregularity in the image plane can be restrained as in the optical beam scanning device of the first aspect of the present invention. Moreover, since the cylindrical lens is provided rotatably around the optical axis of the light beam passage, the angle of the wave plate or the birefringence substance to provide the function of a wave plate can be provided accurately without the need of adding a highly sophisticated part or adjustment so that the polarization direction of the light beam incident on the deflector can be set accurately.

An optical beam scanning device of a sixth aspect of the present invention comprises an optical element for converting an output light beam from a light source to a parallel light beam or a light flux close to a parallel light beam, a cylindrical lens with a plane provided on the incident side, for focusing the output light beam from the optical element in the vicinity of the deflector in the sub scanning direction, and a polarizer provided in the plane of the cylindrical lens, wherein the cylindrical lens is provided rotatably around the optical axis of the light beam passage as the rotation center.

Since the polarization direction of the light beam incident on the deflector by the polarizer can be provided substantially in the main scanning direction, the light amount irregularity in the image plane can be restrained as in the optical beam scanning device of the first aspect of the present invention. Moreover, since the cylindrical lens is provided rotatably around the optical axis of the light beam passage, the angle of the polarizer can be provided accurately without the need of adding a highly sophisticated part or adjustment so that the polarization direction of the light beam incident on the deflector can be set accurately.

An image forming apparatus of a seventh aspect of the present invention comprises a plurality of optical beam scanning devices for forming a scanning line, utilizing a deflector, or an optical beam scanning device with a deflector utilized commonly by a plurality of scanning light beams, for forming a plurality of scanning lines by light beams from a plurality of light sources. Then, at least one of a plurality of the light sources comprises a plurality of semiconductor lasers having different number of light emitting points such that the numbers of the light emitting points of the other semiconductor lasers are a divisor of the maximum number of the light emitting points with respect to the semiconductor laser having the maximum number of the light emitting points.

In the case the numbers of the light emitting points of a plurality of the semiconductor lasers have the above-mentioned relationship, the polarization directions of the light beams output from the semiconductor lasers can easily be same so that the polarization direction at the time of being incident on the deflector of the light beams output from the semiconductor lasers can be aligned substantially in the main scanning direction, and thus the light amount irregularity in the image plane in the scanning lines can be restrained for the reason explained for the first aspect of the present invention, and furthermore, the light amount ratio between the scanning lines of the light beams from the semiconductor lasers can be stabilized regardless of the position in the main scanning direction so that a preferable image can be formed.

An optical beam scanning device of an eighth aspect of the present invention comprises a deflector utilized commonly by a plurality of scanning light beams from a plurality of light sources, wherein a common optical element for having the light beams from a plurality of the light sources passing through before reaching to the deflector, is provided with a wave plate or a birefringence substance to provide the function as the wave plate integrally.

The polarization direction at the time of being incident on the deflector of the light beams from a plurality of the light sources can be aligned in the same direction by the wave plate or the birefringence substance to provide the function as the wave plate so that the polarization directions of the light beams output from the light sources at the time of being incident on the corresponding deflector can be aligned in substantially the main scanning direction, and thus the light amount irregularity in the image plane in the scanning lines can be restrained for the reason explained for the first aspect of the present invention. Moreover, the light amount ratio between the scanning lines of the light beams form the light sources can be stabilized regardless of the position in the main scanning direction so that a preferable image can be formed. Since the wave plate for operating the polarization direction from each light source, or the like needs not be provided for each light source, the configuration can be simplified.

An optical beam scanning device of a ninth aspect of the present invention comprises a deflector utilized commonly by a plurality of scanning light beams from a plurality of light sources, wherein a common optical element for having the light beams from a plurality of the light sources passing through before reaching to the deflector, is provided with a polarizer integrally.

The polarization direction at the time of being incident on the deflector of the light beams from a plurality of the light sources can be aligned in the same direction by the polarizer so that the polarization directions of the light beams output from the light sources at the time of being incident on the corresponding deflector can be aligned in substantially the main scanning direction, and thus the light amount irregularity in the image plane in the scanning lines can be restrained for the reason explained for the first aspect of the present invention. Moreover, the light amount ratio between the scanning lines of the light beams form the light sources can be stabilized regardless of the position in the main scanning direction so that a preferable image can be formed. Since the polarizer for operating the polarization direction from each light source, or the like needs not be provided for each light source, the configuration can be simplified.

BRIEF DESCRIPTION OF THE DRAWINGS

FIG. 8 is an explanatory table showing the peripheral light amount/central part light amount ratio in a transmission type optical element calculated by the formulae (16) to (18) in ,the direction with the polarization direction provided as the P wave, the transmission type optical element approximated to the parallel flat plates, and all the refractive indices are n=1.48, the number of the transmission type optical elements is m, provided with respect to a combination of the number of the surfaces of the polygon mirror is NN;

FIG. 9 is an explanatory table showing the ratio value of the polygon mirror reflection surface length (2W) and the $e^{-2}$ diameter (2ω) on the polygon mirror reflection surface at the time the transmissivity ratio target value, calculated by the formula (21), is tgttr=0.9 with respect to the ratio of the transmissivity at the time of the polygon mirror angle 0 shown in FIG. 8, and the transmissivity at the time of the maximum polygon mirror angle ψmax;

FIG. 10 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 9;

FIG. 11 shows the ratio of the transmissivity at the time of the polygon mirror angle 0 and the transmissivity at the time of the maximum polygon mirror angle ψmax at the time all the light amount irregularity factors from the polygon mirror reflection to the image plane are input, as the multiple of the FIG. 8 value and the FIG. 10 value, that is represented by the formula (19);

FIG. 12 is an explanatory table showing the ratio value of the polygon mirror reflection surface length (2W) and the $e^{-2}$ diameter (2ω) on the polygon mirror reflection surface at the time the transmissivity ratio target value, calculated by the formula (21), is tgttr=1.1 with respect to the ratio of the transmissivity at the time of the polygon mirror angle 0 shown in FIG. 8, and the transmissivity at the time of the maximum polygon mirror angle ψmax;

FIG. 13 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 12;

FIG. 14 shows the ratio of the transmissivity at the time of the polygon mirror angle 0 and the transmissivity at the time of the maximum polygon mirror angle ψmax at the time all the light amount irregularity factors from the polygon mirror reflection to the image plane are input, as the multiple of the FIG. 8 value and the FIG. 13 value, that is represented by the formula (19);

FIG. 15 is an explanatory table showing the ratio value of the polygon mirror reflection surface length (2W) and the $e^{-2}$ diameter (2ω) on the polygon mirror reflection surface at the time the transmissivity ratio target value, calculated by the formula (21), is tgttr=0.95 with respect to the ratio of the transmissivity at the time of the polygon mirror angle 0 shown in FIG. 8, and the transmissivity at the time of the maximum polygon mirror angle ψmax;

FIG. 16 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 15;

FIG. 17 shows the ratio of the transmissivity at the time of the polygon mirror angle 0 and the transmissivity at the time of the maximum polygon mirror angle ψmax at the time all the light amount irregularity factors from the polygon mirror reflection to the image plane are input, as the multiple of the FIG. 8 value and the FIG. 16 value, that is represented by the formula (19);

FIG. 18 is an explanatory table showing the ratio value of the polygon mirror reflection surface length (2W) and the $e^{-2}$ diameter (2ω) on the polygon mirror reflection surface at the time the transmissivity ratio target value, calculated by the formula (21) is tgttr=1.05 with respect to the ratio of the transmissivity at the time of the polygon mirror angle 0 shown in FIG. 8, and the transmissivity at the time of the maximum polygon mirror-angle ψmax;

FIG. 19 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 18;

FIG. 20 shows the ratio of the transmissivity at the time of the polygon mirror angle 0 and the transmissivity at the time of the maximum polygon mirror angle ψmax at the time all the light amount irregularity factors from the polygon mirror reflection to the image plane are input, as the multiple of the FIG. 8 value and the FIG. 19 value, that is represented by the formula (19);

FIG. 21 is an explanatory table showing the ratio value of the polygon mirror reflection surface length (2W) and the $e^{-2}$ diameter (2ω) on the polygon mirror reflection surface at the time the transmissivity ratio target value, calculated by the formula (21), is tgttr=1 with respect to the ratio of the transmissivity at the time of the polygon mirror angle 0 shown in FIG. 8, and the transmissivity at the time of the maximum polygon mirror angle ψmax;

FIG. 22 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 21;

FIG. 23 shows the ratio of the transmissivity at the time of the polygon mirror angle 0 and the transmissivity at the time of the maximum polygon mirror angle ψmax at the time all the light amount irregularity factors from the polygon mirror reflection to the image plane are input, as the multiple of the FIG. 8 value and the FIG. 22 value, that is represented by the formula (19);

FIG. 35 is a schematic perspective view of the fourth embodiment with the cylindrical lens provided with a half wave plate;

FIGS. 36A and 36B are explanatory diagrams for a semiconductor laser of a fifth embodiment, in which FIG. 36A relates to a semiconductor laser (semiconductor laser array) for a black optical beam scanning device, and FIG. 36B relates to a semiconductor laser for yellow, magenta and cyan optical beam scanning devices;

FIGS. 37A and 37B are explanatory diagrams for a semiconductor laser of a sixth embodiment, in which FIG. 37A relates to a semiconductor laser (semiconductor laser array) for a black optical beam scanning device, and FIG. 37B relates to a semiconductor laser for yellow, magenta and cyan optical beam scanning devices;

DETAILED DESCRIPTION OF THE INVENTION

Hereinafter, with reference to the drawings, preferable embodiments of the optical beam scanning devices of the present invention will be explained.

First Embodiment

First, a first embodiment of the present invention will be explained. The first embodiment is characterized in the optical beam scanning device.

Figure 1:
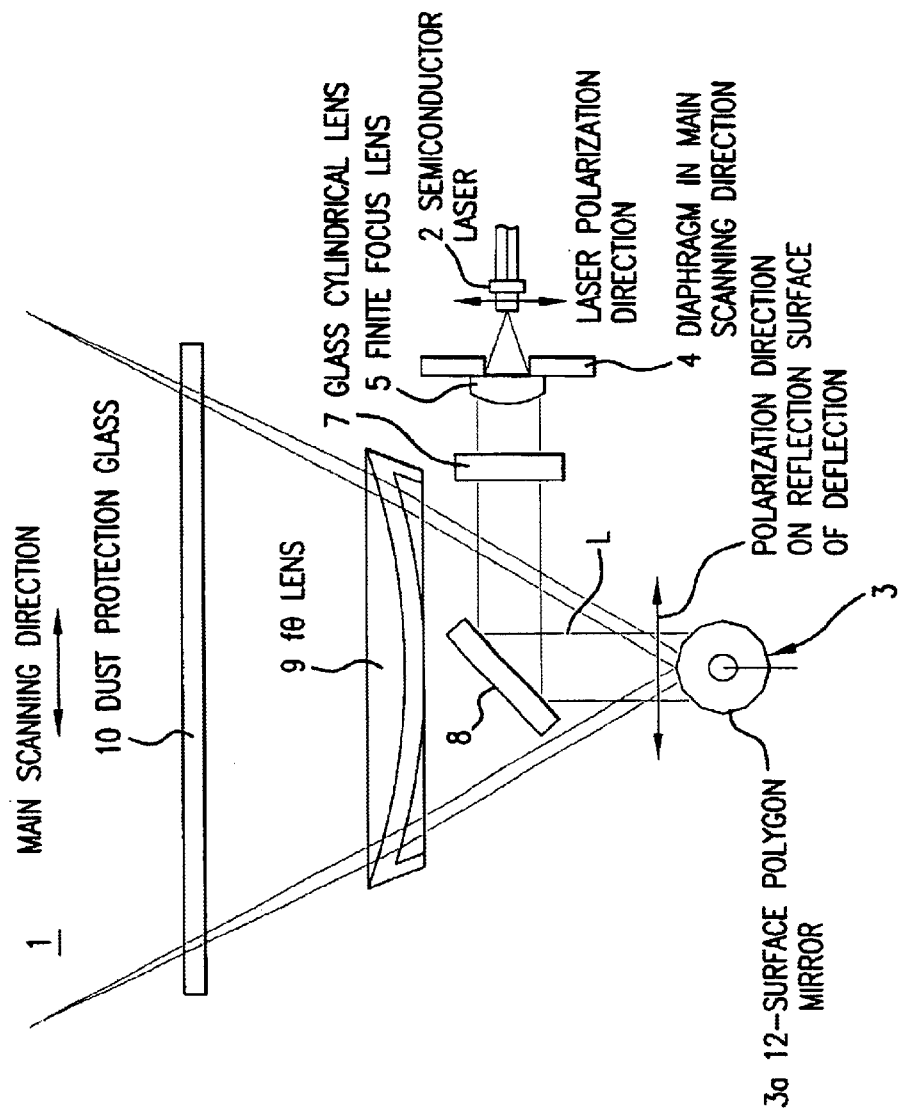
FIG. 1 is a schematic plane view showing an optical beam scanning device of a first embodiment used for an image forming apparatus along the main scanning direction.
Figure 2:
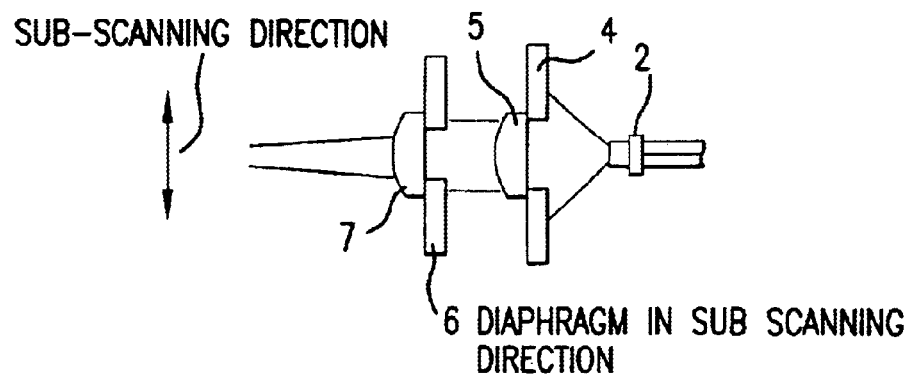
FIG. 2 is a schematic cross-sectional view showing the principal elements of a pre-deflection optical system (light source side) of the optical beam scanning device of the first embodiment along the sub scanning direction.
Figure 3:
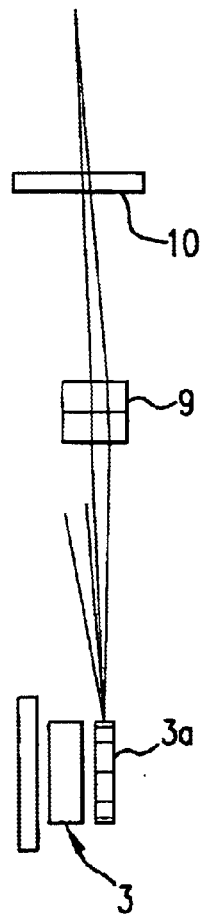
FIG. 3 is a schematic cross-sectional view showing the principal elements of a post-deflection optical system (image plane side) of the optical beam scanning device of the first embodiment along the sub scanning direction.

FIG. 1 is a schematic plane view showing an optical beam scanning device 1 of the first embodiment used for an image forming apparatus along the main scanning direction. FIG. 2 is a schematic cross-sectional view showing the principal elements of a pre-deflection optical system (light source side) of the optical beam scanning device 1 along the sub scanning direction. FIG. 3 is a schematic cross-sectional view showing the principal elements of a post-deflection optical system (image plane side) of the optical beam scanning device 1 along the sub scanning direction.

In FIGS. 1 to 3, the optical beam scanning device 1 of the first embodiment comprises an optical deflecting device 3 for deflecting a laser beam output from a semiconductor laser 2 as the light source to a predetermined position of an image plane (for example, a photosensitive drum, not shown) disposed at a predetermined position by a predetermined linear velocity. In the description below, the direction of deflecting the laser beam by the optical deflecting device 3 is referred to as the main scanning direction.

The optical deflecting device 3 comprises a polygonal mirror main body (polygon mirror) 3a with a plurality of (for example, 12 sets) of flat reflection mirrors (surfaces) arranged in a regular polygonal shape, and a motor 3b for rotating the polygonal mirror main body 3a in the main scanning direction by a predetermined speed (see FIG. 3).

As shown in FIG. 1, the semiconductor laser 2 is mounted so as to output a laser beam L substantially on the plane in the main scanning direction with the direction DA orthogonal to the moving direction provided as the polarization direction. The diverging laser beam L output from the semiconductor laser 2 is provided with a predetermined property by a focus lens 5 with a diaphragm 4 in the main scanning direction attached, and furthermore, it is provided with a predetermined converging property only in the sub scanning direction by a glass cylindrical lens 7 with a diaphragm 6 in the sub scanning direction (see FIG. 2) attached. Thereafter, the laser beam L is reflected by a mirror 8 so as to be incident on the optical deflecting device 3. As shown in FIG. 1, the laser beam L incident on the optical deflecting device 3 also has the polarization direction substantially on the plane in the main scanning direction in the direction orthogonal to the moving direction.

The laser beam L deflected in the main scanning direction by the optical deflecting device 3 passes through an image forming lens (so-called fθ lens) 9 for providing a predetermined optical characteristic, a dust protection glass 10, or the like so as to be focused on the image plane.

The positions in the sub scanning direction of the pre-deflection optical system and the post-deflection optical system are slightly changed such that the laser beam L after deflection does not pass through the optical elements of the pre-deflection optical system.

In the case of the first embodiment, the semiconductor laser (laser diode) 2 has the junction thereof directed in the main scanning direction. The laser beam L processed to a moderate converging light beam by the finite focus lens 5 is incident on the polygonal mirror main body 3a as a light beam having a width in the main scanning direction wider than a reflection surface of the polygonal mirror main body (polygon mirror) 3a. That is, the so-called over fill method is adopted. The laser beam L output from the semiconductor laser 2 has the beam divergence angle smaller in the main scanning direction so as to provide the polarization in the main scanning direction. Therefore, an extremely large beam size is provided in the sub scanning direction. Then, the effective beam size in the sub scanning direction is made smaller by the diaphragm 6 in the sub scanning direction disposed at the image side focal position of the finite focus lens 5.

It is also possible to dispose a beam compressor for compressing the beam width in the sub scanning direction between the finite focus lens 5 and the cylindrical lens 7 instead of the diaphragm 6 in the sub scanning direction. As the beam compressor, one utilizing a prism having an incident surface and an output surface with an angle provided in the sub scanning direction, one having a combination of a lens with a positive power only in the sub scanning direction disposed on the optical path upstream side and a lens with a negative power only in the sub scanning direction disposed on the downstream side, or the like can be used.

Moreover, it is also possible to provide a beam expander for expanding the beam width in the main scanning direction in stead of the diaphragm 6 in the sub scanning direction. As the beam expander, one utilizing a prism having an incident surface and an output surface with an angle provided in the main scanning direction, one having a combination of a lens with a negative power only in the main scanning direction disposed on the optical path upstream side and a lens with a positive power only in the main scanning direction disposed on the downstream side, or the like can be used.

As mentioned above, the first embodiment is such that the incident light beam L is incident as the P polarized light beam (P wave) on the polygonal mirror main body (for example, 12-surface polygon mirror) 3a in the optical beam scanning device using the so-called over fill method.

Hereinafter, the reason why the characteristic is adopted will be explained.

Figure 4:
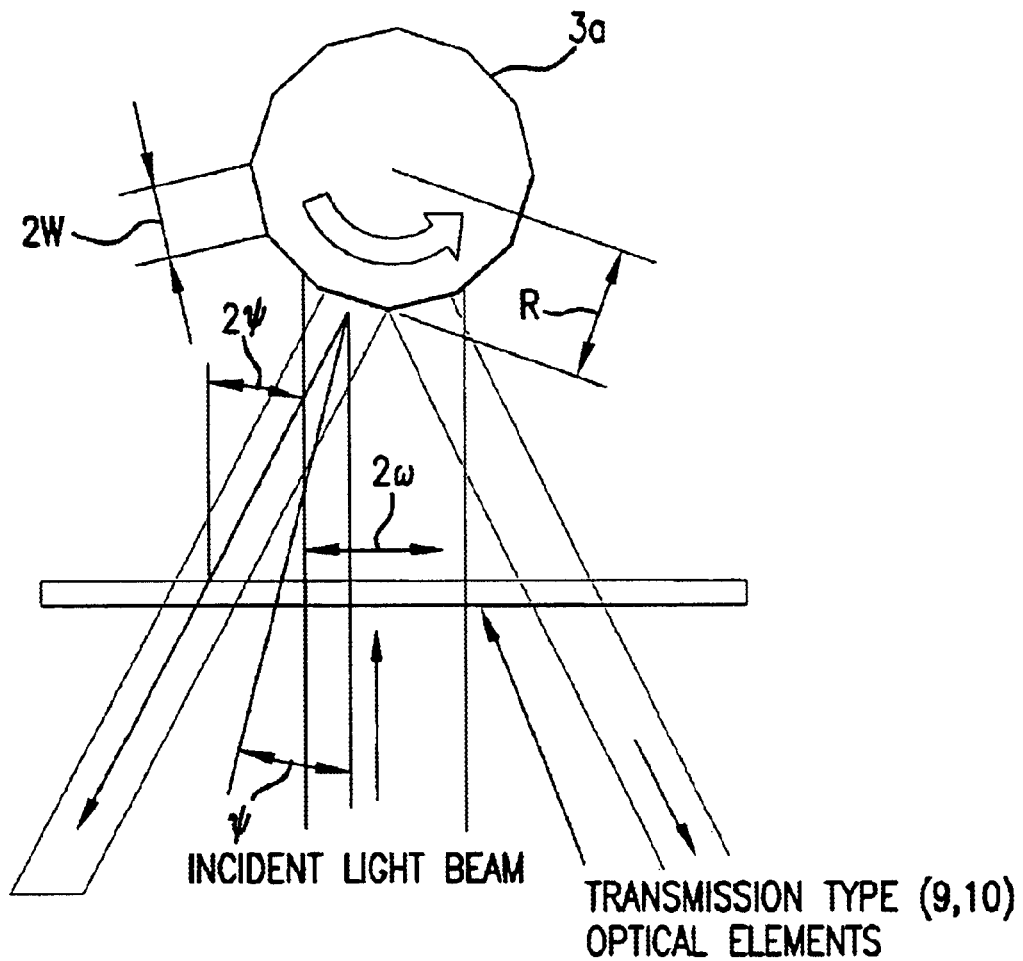
FIG. 4 is a schematic plane view showing various parameters in the over fill method with a deflector.

FIG. 4 is a schematic plane view showing various parameters in the over fill method with a deflector main body (polygon mirror) 3a. In FIG. 4, the transmission type optical elements represent the image forming lens 9 and/or the dust protection glass 10, or the like.

As shown in FIG. 4, according to the over fill method, a part of the incident light beam is reflected by the reflection surface having a width 2W narrower than the width 2ω of the incident light beam. In the case of the deflector 3a of the over fill method, for the following two reasons, if the deflecting angle (in the figure, 2ψ) is made larger, the power on the image plane is made smaller.

1. Even in the case the intensity distribution of the incident light beam is constant, as to the ratio of the light beam to be reflected from the incident light beam, the principal ray of the incident light beam and the normal direction of the reflection surface are identical in most cases. In the case the angle between the principal ray of the incident light beam and the normal direction of the reflection surface is ψ, the projection width becomes cos ψ so that the projection width is made smaller.

2. In the case the semiconductor laser (laser diode) 2 is provided as the light source, the intensity distribution of the incident light beam is close to the Gauss distribution. Therefore, in the case a light beam off the principal ray is to be reflected, that is, in the case ψ is large, the light amount is made smaller. The state thereof is shown in FIG. 5.

Figure 5A:
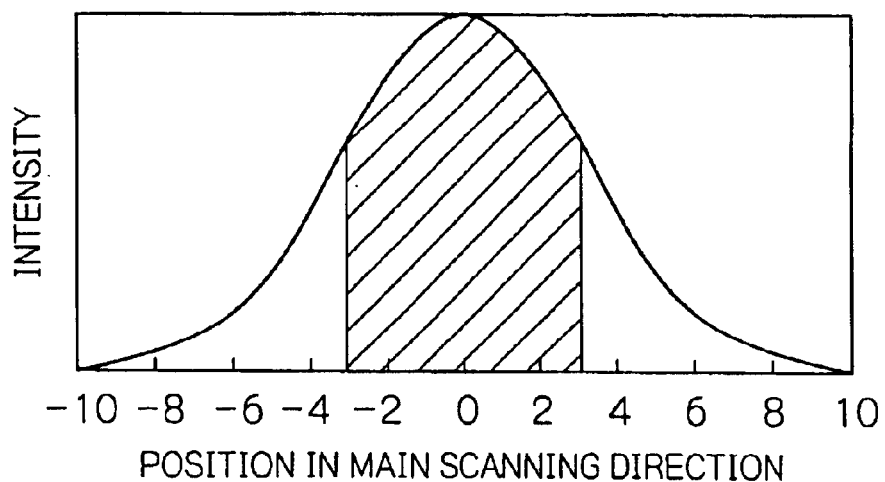
FIGS. 5A and 5B are diagrams for explaining the relationship between the reflection surface inclination and the reflected light amount in the over fill method.
Figure 5B:
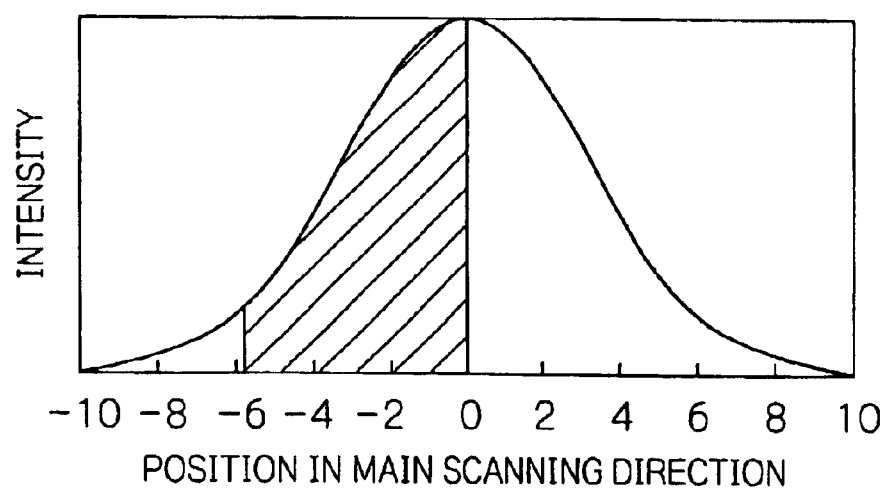

In the case the principal ray of the incident light beam and the normal direction of the reflection surface are identical, the light amount included in the hatched part in FIG. 5A is reflected. In the case the reflection surface is inclined for ψ, the light amount included in the hatched part in FIG. 5B is reflected. As it is apparent from the figures, in the case the reflection surface is inclined for v according to the rotation, the light amount is reduced.

Now, the inscribing circle radius of the deflector (hereinafter, optionally referred to as the polygon mirror) is defined as R, the number of surfaces of the polygon mirror as NN, the width of the polygon mirror reflection surface as 2W, the maximum incident angle onto the polygon mirror as ψmax, and the incident beam $e^{-2}$ radius on the polygon mirror reflection surface as ω. Moreover, a coordinate system in which the straight line on the polygon mirror surface orthogonal to the polygon mirror rotation axis at the time the incident angle in the main scanning direction to the polygon mirror reflection surface is 0 is provided as the y axis, and the middle point of the polygon mirror reflection surface is provided as the origin (y=0) of the y axis will be considered.

The Y coordinates at the two edge parts of a predetermined surface of the polygon mirror are represented by the formulae (1) and (2) in the case the maximum incident angle to the polygon mirror is the maximum polygon mirror angle ψmax, and it is represented by the formulae (3) and (4) in the case it is incident on the polygon mirror reflection surface vertically.

$$y1s = R*\sin(\psi max) + W*\cos(\psi max) \quad (1)$$

$$y1e = R*\sin(\psi max) - W*\cos(\psi max) \quad (2)$$

$$y0s = R*\sin(0) + W*\cos(0) = W \quad (3)$$

$$y0e = R*\sin(0) - W*\cos(0) = -W \quad (4)$$

The light amount reflected by the polygon mirror surface at the time is represented by the formula (5) at the time the maximum incident angle to the polygon mirror is the maximum polygon mirror angle ψmax, and it is represented by the formula (6) in the case it is incident on the polygon mirror reflection surface vertically with the premise that the incident light beam is substantially approximated to the parallel light beam so that the incident light beam width is not changed even in the case the reflection position by the polygon mirror is changed along the incident light beam moving direction.

$$I(\psi max) = \int_{y1e}^{y1s} e^{-2(\frac{y}{\omega})^2} dy \quad (5)$$

$$I(0) = \int_{y0e}^{y0s} e^{-2(\frac{y}{\omega})^2} dy = \int_{-W}^{W} e^{-2(\frac{y}{\omega})^2} dy \quad (6)$$

This type of the optical system can be utilized for the image formation in all the periods except the period for the horizontal synchronization, and the period for adjusting the laser power. Therefore, with the approximation that all the period from the passage of a light beam reflected by a predetermined surface at a predetermined position to the passage of a light beam reflected by the next surface at the predetermined position can be used as the image area, the effective polygon mirror angle of the polygon mirror is defined as ψmax (=π/NN)~ψmin (=-π/NN). Moreover, there is the relationship of W=R×tan (π/NN) By using them in the formulae (5) and (6) for calculating the ratio of the light amount with the largest polygon mirror angle and the light amount with the 0 polygon mirror angle, the formula (7) can be obtained.

$$\frac{I_{pol}(\psi max)}{I_{pol}(0)} = \frac{erf\{2\sqrt{2}\frac{W}{\omega}\times\cos(\frac{\pi}{NN})\}}{2erf(\sqrt{2}\frac{W}{\omega})} \quad (7)$$

The erf[z] in the formula (7) is the integral value of the Gauss distribution provided by the formula (8).

$$erf(z) = \frac{2}{\sqrt{\pi}}\int_0^z e^{-t^2} dt \quad (8)$$

In contrast, it is known that the angle dependency of the transmissivity is changed by the light beam polarization direction. The transmissivity represented by the (output light amount from the parallel flat plate/incident light amount to the parallel flat plate) obtained by multiplying the transmissivity of the incident surface at the time a light beam of the P polarization or the S polarization is incident on a parallel flat plate of an n refractive index by an incident angle θin and the transmissivity of the output surface is represented by the formula (9) in the case of the P polarization, and it is represented by the formula (10) in the case of the S polarization. However, in the cases of the incident angle θin=0, the transmissivity represented by the (output light amount from the parallel flat plate/incident light amount to the parallel flat plate) is represented by the formula (11) both in the case of the P polarization and the S polarization.

$$Tp = \left(1 - \frac{\tan^2(\theta out - \theta in)}{\tan^2(\theta out + \theta in)}\right)^2 \quad (9)$$

$$Ts = \left(1 - \frac{\sin^2(\theta out - \theta in)}{\sin^2(\theta out + \theta in)}\right)^2 \quad (10)$$

-continued $$Ts, p = \left(1 - \frac{(n-1)^2}{(n+1)^2}\right)^2 \quad (11)$$

Here, θin is the incident angle to the parallel flat plate, and θout is the output angle from the parallel flat plate. Between the angles, the Snell's law, that is, the formula (12) is formed.

$$n = \sin(\theta \text{ out}) = \sin(\theta \text{ in}) \quad (12)$$

Although it will be explained later in detail, in general, in an optical beam scanning device, by setting a semiconductor laser with a larger polygon mirror angle in the main scanning direction, and one with a smaller polygon mirror angle in the sub scanning direction, the size of a finite focus lens (or a collimator lens) for converting diverging light beam to a moderate converging light beam, a diverging light beam or a parallel light beam is miniaturized, and furthermore, too much enlargement of the distance between the cylindrical lens and the polygon mirror is prevented. In contrast, in the case of a semiconductor laser, according to the structure, the polarization direction is oriented to the direction with a small polygon mirror angle by a rate of 99% or more. Therefore, in general, the incidence to the reflection surface of the polygon mirror is provided in the S polarization state, however, the formula (10) representing the transmissivity in the case thereof is a function that the transmissivity Ts is lowered monotonously if the absolute value of the θin is increased.

As heretofore mentioned, in the case of the deflection method (over fill method) of inputting a light beam with the width wider in the main scanning direction with respect to the deflector surface, (i) with a larger polygon mirror angle at the time it is reflected by the polygon mirror, the light amount is reduced, and furthermore, (ii) in the case of the S polarized light beam incident on the polygon mirror, each time it passes through the transmission type optical elements, the transmissivity is lowered with a larger polygon mirror angle, and as a result the light amount irregularity in the image plane is enlarged.

In the case of making image by the electrophotography method, in general, in the case the light amount irregularity exceeds 10% (p-p), even in the case of half tone printing using the dither method, or the binary error diffusion method, the density irregularity is perceived. In the case of half tone printing by the screen-tone method, the multiple value error diffusion method, or the like of controlling the laser light emitting time or power in a pixel, or controlling the light amount, the demand to the light amount irregularity becomes severer so that one of about 5% (p-p) is required.

Figure 6:
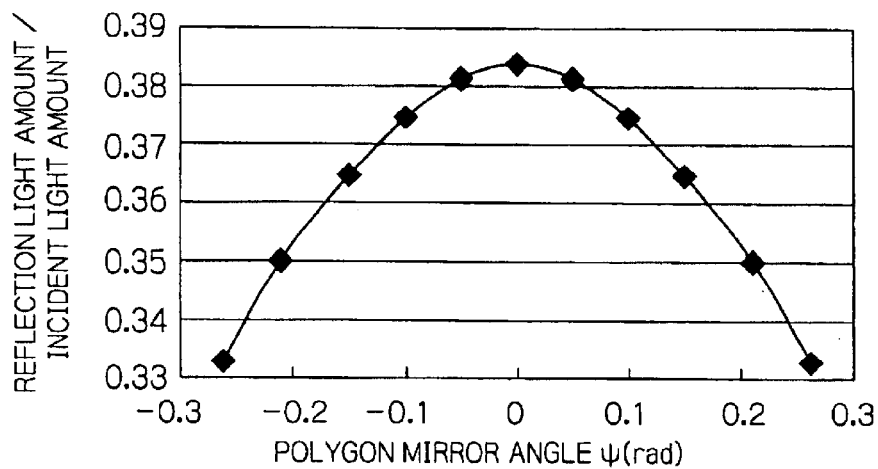
FIG. 6 is a graph showing the change of the polygon mirror reflected light amount with respect to the polygon mirror angle.

FIG. 6 is a graph showing the state of the change of the polygon mirror reflection light amount with respect to the polygon mirror angle (see the formula (7)). FIG. 6 shows the case that the (diameter of the incident light beam $e^{-2}$/ polygon mirror reflection surface width (2W)) is 2, the polygon mirror inscribing circle diameter is 24 [mm], and the number of the polygon mirror reflection surface is 12.

Figure 7:
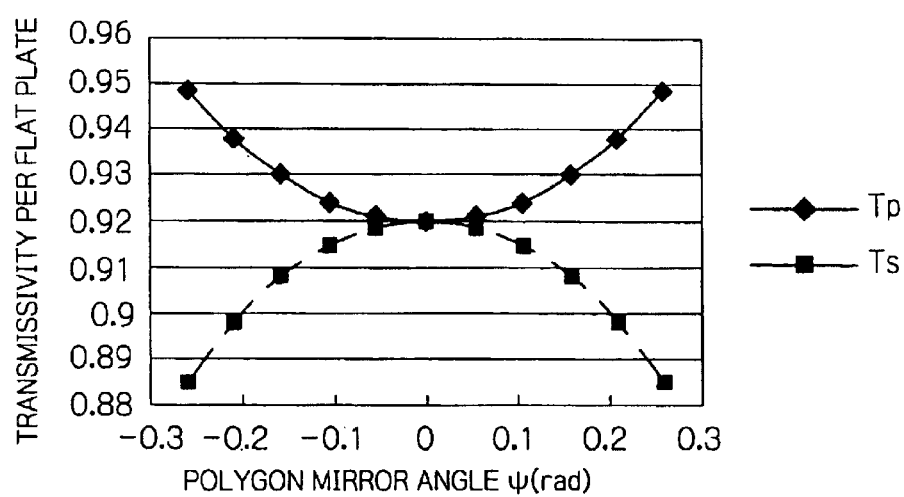
FIG. 7 is a graph showing the transmissivity change with respect to the incident angle with a parallel flat plate with the cases of the P polarized light beam and the S polarized light beam.

FIG. 7 is a graph showing the state of the transmissivity change with respect to the incident angle with a parallel flat plate with a 1.51 refractive index with the cases of the P polarized light beam and the S polarized light beam. In FIG. 7, Tp represents the state incident on the parallel flat plate as the P polarized light beam, and Ts represents the state as the S polarized light beam. In the range shown in the figure, it is known that Tp has the transmissivity larger with a larger polygon mirror angle.

From FIGS. 6 and 7, it is learned that in the case the S polarized laser beam is incident on the polygon mirror, the light amount irregularity with respect to the polygon mirror angle by the reflection and the light amount irregularity with respect to the polygon mirror angle by the transmission of the parallel flat plate are synthesized so as to increase the light amount irregularity, and in the case the P polarized laser beam is incident on the polygon mirror, the light amount irregularity with respect to the polygon mirror angle by the reflection and the light amount irregularity with respect to the polygon mirror angle by the transmission of the parallel flat plate are offset so as to reduce the light amount irregularity.

In reality, the transmissivity of the P polarized light beam is increased monotonously until the Brewster angle θ=arctan (n), and at an angle more than that, the transmissivity is rather lowered. Therefore, in the case a light beam is incident on at least the transmission type optical element by an angle of the Brewster angle or less, the light amount irregularity can be restrained even in the case a light beam with a width wider than the surface of the deflector in the main scanning direction is incident (even in the case the over fill method is adopted), by skillfully combining the beam size of the input Gaussian beam with respect to the width of the polygon mirror, and the number of the transmission type optical systems.

The above-mentioned is the reason why the incident light beam L is incident on the deflector main body (polygon mirror) 3a as a P polarized light beam (P wave) in the optical beam scanning device of the first embodiment using the so-called over fill method.

Although explanation has been given in the above-mentioned description with the premise that the transmission type optical element of the post-deflection optical system is a parallel flat plate, in the description below, with the premise that m pieces of the transmission type optical element are used, and the transmission type optical elements are parallel flat plates, in what conditions the light amount irregularity can be restrained within the target value tgttr will be discussed. The target value tgttr represents the target value of the transmissivity at the time of the polygon mirror angle maximum value in the image plane/the transmissivity at the time of the polygon mirror angle 0.

The light beam incident on the polygon mirror by the incident angle ψ is incident, on the parallel flat plates by the 2ψ incident angle as shown in FIG. 4. In the case the light beam incident on the polygon mirror is the P polarized light beam or the S polarized light beam, the polarization direction thereof can be maintained also on the optical element. In other cases, it is not always maintained, but with the approximation that it is not changed drastically, the discussion will be carried out. Considering the case with the polygon mirror incident angle ψmax, and the angle α of the polarization direction (P polarized light beam) on the polygon mirror from the main scanning direction, and using the formula (12) in the formulae (9), (10), the transmissivity represented by the (output light amount from the parallel flat plates/the incident light amount to the parallel flat plates) in this case can be represented by the formula (15). The formulae (13) and (14) represent the transmissivity at the time the angle α is 0, and the angle α is π/2, and the formula (15) is represented, utilizing the description of the transmissivity.

$$Tp(\psi max, n_i) = \left\{ 1 - \frac{\tan^2\left(\arcsin\left[\frac{\sin(2\psi max)}{n_i}\right] - 2\psi max\right)}{\tan^2\left(\arcsin\left[\frac{\sin(2\psi max)}{n_i}\right] + 2\psi max\right)} \right\}^2 \quad (13)$$

$$Ts(\psi max, n_i) = \left\{ 1 - \frac{\sin^2\left(\arcsin\left[\frac{\sin(2\psi max)}{n_i}\right] - 2\psi max\right)}{\sin^2\left(\arcsin\left[\frac{\sin(2\psi max)}{n_i}\right] + 2\psi max\right)} \right\}^2 \quad (14)$$

$$Tp, s(\psi max, n_i, \alpha) = \cos^2\alpha \times Tp(\psi max, n_i) + \sin^2\alpha \times Ts(\psi max, n_i) \quad (15)$$

Here, $n_i$ represents the refractive index of the ith transmission type optical element after the polygon mirror reflection.

By dividing each transmissivity represented by the formulae (13) to (15) by the transmissivity represented by the formula (11) at the time the polygon mirror angle is 0 for calculating the ratio and putting them in order, the formulae (16) to (18) can be obtained.

$$\frac{Tp(\psi max, n_i)}{Tp(0, n_i)} = \frac{(1+n_i)^4 \left(1 - \cot^2\left[\frac{2\pi}{NN} + \arcsin\left\{\frac{\sin\left(\frac{2\pi}{NN}\right)}{n_i}\right\}\right]\right)}{\tan^2\left[\frac{2\pi}{NN} - \arcsin\left\{\frac{\sin\left(\frac{2\pi}{NN}\right)}{n_i}\right\}\right]^2} \quad (16)$$

$$\frac{Ts(\psi max, n_i)}{Ts(0, n_i)} = \frac{(1+n_i)^4 \left(1 - \csc^2\left[\frac{2\pi}{NN} + \arcsin\left\{\frac{\sin\left(\frac{2\pi}{NN}\right)}{n_i}\right\}\right]\right)}{\sin^2\left[\frac{2\pi}{NN} - \arcsin\left\{\frac{\sin\left(\frac{2\pi}{NN}\right)}{n_i}\right\}\right]^2} \quad (17)$$

$$\frac{Tp, s(\psi max, n_i, \alpha)}{Tp, s(0, n_i)} = \cos^2\alpha \times \frac{Tp(\psi max, n_i)}{Tp(0, n_i)} + \sin^2\alpha \times \frac{Ts(\psi max, n_i)}{Ts(0, n_i)} \quad (18)$$

The light amount ratio in the image plane at the time of the polygon mirror angle 0 and the maximum polygon mirror angle ψmax can be obtained by multiplying the formula (7) representing the light amount change by the polygon mirror reflection and the formulae (16) to (18) representing the light amount change each time of passage through the transmission type optical elements there after, and the number of the transmission type optical elements (the optical elements for transmitting the light beam; the lens, the parallel flat plate, or the like). However, in the case the transition type optical elements with different refractive indices are used, for example, the lens is made of a resin, the dust protection cover parallel flat plate, the polygon mirror cover parallel flat plate are made of a glass, or the like, the values calculated by the formulae (16) to (18) corresponding to each refractive index should be multiplied. With the refractive index of the transmission type optical element disposed on the ith order on the downstream side of the optical path of the polygon mirror reflection surface defined as $n_i$, the light amount ratio in the image plane can be represented by the formula (19).

$$\frac{I_{total}(\psi max)}{I_{total}(0)} = \frac{erf\left\{2\sqrt{2}\frac{W}{\omega} \times \cos\left(\frac{\pi}{NN}\right)\right\}}{2erf\left(\sqrt{2}\frac{W}{\omega}\right)} \times \prod_{i=1}^{m} \frac{Tp, s(\psi max, n_i, \alpha)}{Tp, s(0, n_i)} \quad (19)$$

In the case the light amount ratio in the image plane is between 0.9 to 1.1, the light amount irregularity 10% (p-p) as the tolerance value for an ordinary optical beam scanning device for an electrophotography device can be satisfied, and in the case it is between 0.95 to 1.05, the light amount irregularity 5% (p-p) as the tolerance value for an optical beam scanning device for an electrophotography device for executing half tone printing by the method of controlling the laser light emitting time in a pixel, or controlling the light amount, used in a color outputting device, or the like can be satisfied.

Although the transmissivity has been dealt with by approximating the transmission type optical element to the parallel flat plate in the description above, in order to obtain a further accurate value, it is desirable to calculate the incident angle to the transmission type optical element (a lens, or the like) by the simulation, and calculating the ratio of the transmissivity at the time of the polygon mirror angle 0 and the transmissivity at the time of the maximum polygon mirror angle ψmax of the optical path on the downstream side with respect to the polygon mirror reflection including the transmissivity with respect to each polarization direction in each surface, the deposition film in each surface, the influence of the reflection mirror, or the like, or by actually measuring the light amount in the image plane immediately after the polygon mirror reflection, and calculating the ratio of the transmissivity at the time of the polygon mirror angle 0 (image plane light amount/light amount immediately after the polygon mirror reflection) and the transmissivity at the time of the maximum polygon mirror angle ψmax (image plane light amount/light amount immediately after the polygon mirror reflection) on the downstream side with respect to the polygon mirror.

Here, with the transmissivity at the time of the polygon mirror angle 0 and the transmissivity at the time of the maximum polygon mirror angle ψmax of the optical path on the downstream side with respect to the polygon mirror reflection defined as γ, the light amount irregularity amount with the light amount irregularity by the polygon mirror reflection taken into consideration can be represented by the formula (20).

$$\frac{I_{total}(\psi max)}{I_{total}(0)} = \frac{erf\left\{2\sqrt{2}\frac{W}{\omega} \times \cos\left(\frac{\pi}{NN}\right)\right\}}{2erf\left(\sqrt{2}\frac{W}{\omega}\right)} \times \gamma \quad (20)$$

In the case the value of the formula (20) is between 0.9 to 1.1, the light amount irregularity 10% (p-p) as the tolerance value for an ordinary optical beam scanning device for an electrophotography device can be satisfied, and in the case it is between 0.95 to 1.05, the light amount irregularity 5% (p-p) as the tolerance value for an optical beam scanning device for an electrophotography device for executing half tone printing by the method of controlling the laser light emitting time in a pixel, or controlling the light amount, used in a color outputting device, or the like can be satisfied.

Since calculation needs to be repeated in order to calculate the solution by the formulae, the formula (7) is shown as a polynomial. Moreover, by executing the Taylor's expansion for W/ω to the fourth order in the vicinity of 0 (in consideration of the actual error, calculation to the fourth order is sufficient), and calculating the solution to have the value of the formula (20), that is, the total transmissivity ratio of the polygon mirror angle 0 in the image plane and the maximum polygon mirror angle ψmax including the influence of the polygon mirror reflection surface (it is equal to the light amount ratio in the image plane) becomes the target value tgttr, the formula (21) can be obtained.

$$\frac{W}{\omega} = \left(-15 + 60\cos^2\left(\frac{\pi}{NN}\right) - \left[3\sqrt{5}\left\{2tgttr \times \gamma \times \cos\left(\frac{\pi}{NN}\right) + 3\gamma^2\cos^2\left(\frac{\pi}{NN}\right) - 80tgttr \times \gamma \times \cos^3\left(\frac{\pi}{NN}\right) + 40\gamma^2\cos^4\left(\frac{\pi}{NN}\right) + 288tgttr \times \gamma \times \cos^5\left(\frac{\pi}{NN}\right) - 208tgttr^2\cos^6\left(\frac{\pi}{NN}\right)\right\}^{\frac{1}{2}} \times \sec\left(\frac{\pi}{NN}\right)\right] / \gamma\right)^{\frac{1}{2}} / \sqrt{2 - 80\cos^2\left(\frac{\pi}{NN}\right) + 288\cos^4\left(\frac{\pi}{NN}\right)}$$ (21)

As the ratio y of the transmissivity at the time of the polygon mirror angle 0 and at the time of the maximum polygon mirror angle ψmax of the optical path on the downstream side with respect to the polygon mirror reflection at the time, the value obtained by approximating the transmissivities obtained by the simulation, the actual measurement, or the calculation by the formulae (16) to (18) to the transmissivity of each transmission type optical element, and multiplying the same is used. Moreover, the target value tgttr is set between 0.9 to 1.1 for restraining the light amount irregularity within 10% (p-p) for an ordinary optical beam scanning device for an electrophotography device, and it is set between 0.95 to 1.05 for restraining the light amount irregularity within 5% (p-p) for an optical beam scanning device for a color electrophotography device for executing half tone printing by the method of controlling the laser light emitting time in a pixel, or controlling the light amount, used in a color outputting device, or the like. Of course tgttr=1 is ideal.

FIG. 8 shows the peripheral light amount/central part light amount ratio by m pieces of transmission type optical elements calculated by the formulae (16) to (18) in the direction with the polarization direction provided as the P wave (therefore, the formula (16) is used), the transmission type optical elements approximated to the parallel flat plates, and all the refractive indices n=1.48, the number of the transmission type optical elements is m, provided with respect to a combination of the number of the surfaces of the polygon mirror is NN.

As mentioned above, in the case a light beam is incident on the transmission type optical elements by an angle of the Brewster angle or more, the transmissivity is lowered. As to the angle per one surface of the polygon mirror, with the premise that the entirety thereof can be used as the image area, it is 2π/NN. Since the reflection light beam is deflected by the angle double as much as this, it is deflected by 4π/NN for the range. In order to restrain the light amount irregularity, it is preferable that it is allotted to ±4π/NN/2= 2π/NN with the incident angle 0 degree to the transmission type optical elements provided as the center. Since the light amount in the image plane is lowered at the time of the maximum polygon mirror angle in the case the 2π/NN value is not smaller than the largest Brewster angle in the transmission type optical elements, it is necessary to satisfy the conditional formula of the formula (22). Since the formula (23) c an be obtained by rewriting the formula (22), the number of the surfaces of the polygon mirror NN needs to satisfy the conditional formula of the formula (23).

$$\frac{2\pi}{NN} < \arctan(\max(n_i))$$ (22)

$$NN > \frac{\pi}{\arctan(\max(n_i))}$$ (23)

In the case of FIG. 8, the Brewster angle of the (refractive index n=1.48) is arctan (n)=arctan (1.48)=0.977 rad=55.95. The number of the surfaces is 2π/arctan (n)=6.43, and thus it should be 7 surfaces or more.

FIG. 9 shows the ratio value of the polygon mirror reflection surface length (2W) and the $e^{-2}$ diameter (2ω) on the polygon mirror reflection surface at the time the transmissivity ratio target value, calculated by the formula (21), is tgttr=0.9 with respect to the ratio of the transmissivity at the time of the polygon mirror angle 0 shown in FIG. 8, and the transmissivity at the time of the maximum polygon mirror angle ψmax in the optical path on the downstream side with respect to the polygon mirror reflection. Here, the column marked with "–" denotes that there is no solution so that tgttr=0.9 is in a range incapable of adopting the formula (21) by the combination. In this case, the value of tgttr is made larger until a solution can be obtained. The part with "–" in FIG. 9 has a solution with tgttr=0.95. Here, the value of FIG. 15 to be described later is used.

FIG. 10 shows the peripheral light amount/central part light amount (in the case one with the above-mentioned beam size is incident) by the polygon mirror reflection, calculated by the formula (7) with respect to the polygon mirror reflection surface length (2W)/$e^{-2}$ diameter (2ω) on the polygon mirror reflection surface shown in FIG. 9.

FIG. 11 shows the ratio of the transmissivity at the time of the polygon mirror angle 0 and the transmissivity at the time of the maximum polygon mirror angle ψmax at the-time all the light amount irregularity factors from the polygon mirror reflection to the image plane are input, as the multiple of the FIG. 8 value and the FIG. 10 value, that is, represented by the formula (19). In FIG. 11, a combination not identical to the transmissivity target value tgttr=0.9 is provided due to the influence of executing the Taylor's expansion to the fourth order.

In the case with the target value tgttr provided as 1.1, the figures similar to FIGS. 9 to 11 are shown in FIGS. 12 to 14. In the case with the target value tgttr provided as 0.95, the figures similar to FIGS. 9 to 11 are shown in FIGS. 15 to 17. In the case with the target value tgttr provided as 1.05, the figures similar to FIGS. 9 to 11 are shown in FIGS. 18 to 20. In the case with the target value tgttr provided as 1, the figures similar to FIGS. 9 to 11 are shown in FIGS. 21 to 23.

Here, the column marked with "–" in FIGS. 12 and 18 denotes that with this combination, there is no solution so that tgttr=1.1, or tgttr=1.05 is in a range not to be achieved (however smaller the value of the polygon mirror reflection surface length (2W)/$e^{-2}$ diameter (2ω) on the polygon mirror reflection surface is made, the ratio cannot be obtained). Therefore, as to the combinations of the columns marked with "–", there is no lower limit of the value of the polygon mirror reflection surface length (2W)/$e^{-2}$ diameter (2ω) on the polygon mirror reflection surface, and there are only the upper limits shown in FIG. 9 or 15.

In order to restrain the polygon mirror reflection surface length (2W)/$e^{-2}$ diameter (2ω) on the polygon mirror reflection surface within the light amount irregularity 10% (p-p) for an ordinary optical beam scanning device for an electrophotography device, a value between the upper limit shown in FIG. 9 and the lower limit shown in FIG. 12 (in the case it is marked with "–", there is no lower limit) is used, and in order to restrain the same within the light amount irregularity 5% (p-p) for an optical beam scanning device for a color electrophotography device for executing half tone printing by the method of controlling the laser light emitting time in a pixel, or controlling the light amount, used in a color outputting device, a value between the upper limit shown in FIG. 15 and the lower limit shown in FIG. 18 (in the case it is marked with "–", there is no lower limit) is used so that an optical beam scanning device for an electrophotography device with the light amount irregularity within the tolerance range can be provided. The ideal state is obtained at the time of the value of the polygon mirror reflection surface length $(2W)/e^{-2}$ diameter $(2\omega)$ on the polygon mirror reflection surface shown in FIG. 21.

The optical beam scanning device 1 of the first embodiment shown in FIGS. 1 to 3 has the number NN of the surfaces of the polygon mirror 3 as 12, the fθ lens 9 made of a PMMA and the dust protection glass 10 made of a glass as the transmission type optical elements after deflection, with each refractive index as $n_1=1.488$ and $n_2=1.514$. By calculating each transmissivity using the formula (16) with each approximated to the parallel flat plate, 1.03 and 1.032 are obtained. The multiple δ of the transnissivities becomes $\delta=1.03\times1.032=1.063$. Here, with γ=δ in the formula (21), the reflection surface length/$e^{-2}$ diameter on the polygon mirror reflection surface is calculated.

In the case tgttr>1.05, a solution cannot be obtained by the formula (21). That is, however large $e^{-2}$ diameter on the polygon mirror reflection surface is made, a value with the light amount increased by 5% of the polygon mirror angle 0 cannot be obtained at the time of the maximum polygon mirror angle.

In the case tgttr=0.9, if the reflection surface length/$e^{-2}$ diameter on the polygon mirror reflection surface is 0.29, that is, the $e^{-2}$ diameter on the polygon mirror reflection surface is 3.48 times as much as the polygon reflection surface width or more, the light amount irregularity can be provided at 10% (p-p) or less. According to an image forming apparatus for half tone printing using the dither method or the binary error diffusion method with a large light amount irregularity tolerance value, the $e^{-2}$ diameter on the polygon mirror reflection surface can be provided as 3.48 times as much as the polygon reflection surface width or more.

In the case tgttr=0.95, if the reflection surface length/$e^{-2}$ diameter on the polygon mirror reflection surface is 0.21, that is, the $e^{-2}$ diameter on the polygon mirror reflection surface is 4.68 times as much as the polygon reflection surface width (the reflection surface length) or more, the light amount irregularity can be provided at 5% (p-p) or less. According to half tone printing by the screen-tone method, the multiple value error diffusion method, or the like of controlling the laser light emitting time in a pixel, or controlling the light amount, the $e^{-2}$ diameter on the polygon mirror reflection surface can be provided as 4.68 times as much as the polygon reflection surface width or more.

In the case tgttr=1, if the reflection surface length/$e^{-2}$ diameter on the polygon mirror reflection surface is 0.12, that is, the $e^{-2}$ diameter on the polygon mirror reflection surface is about 8.21 times as much as the polygon reflection surface width, the light amount irregularity can be made to substantially 0.

Figure 24:
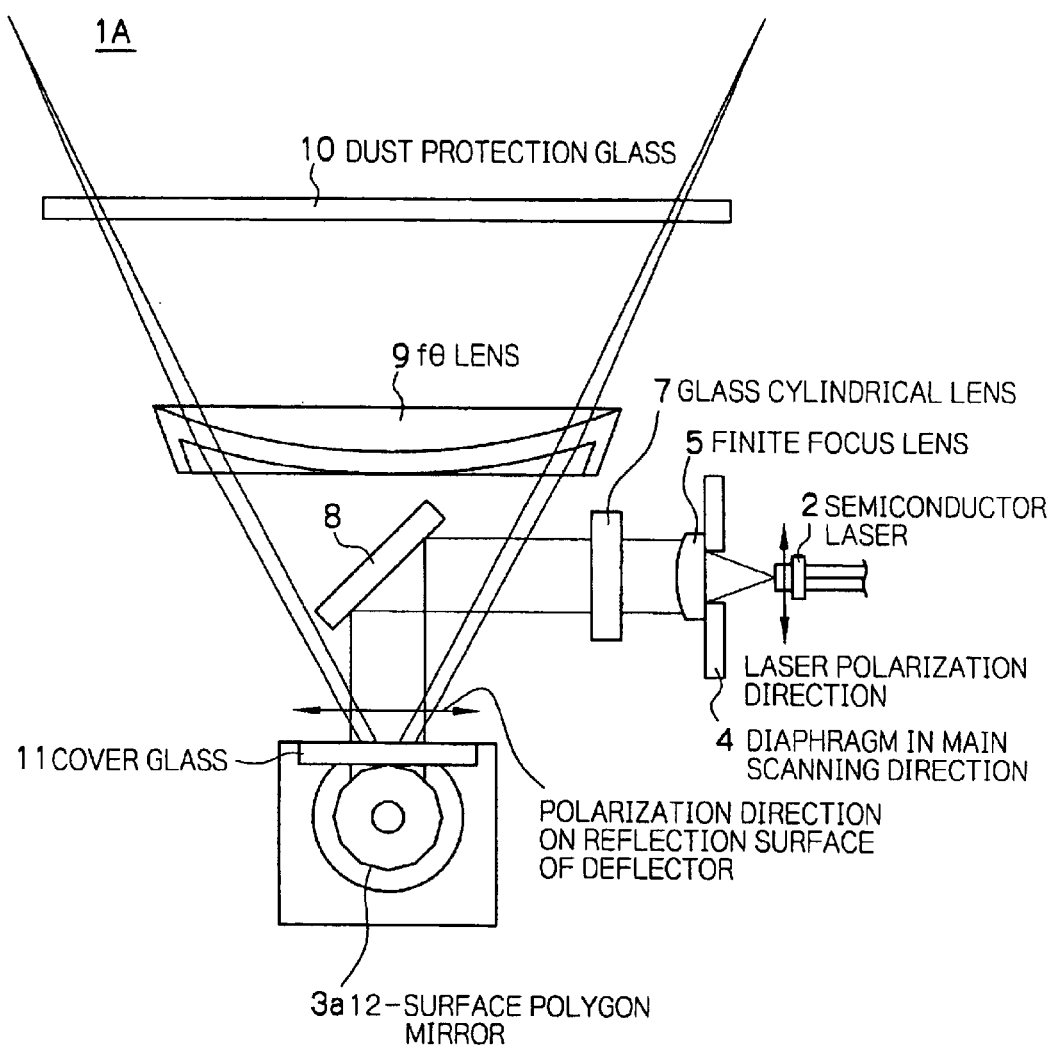
FIG. 24 is a schematic plane view showing the optical beam scanning device of the first embodiment with a polygon mirror cover glass added along the main scanning direction.
Figure 25:
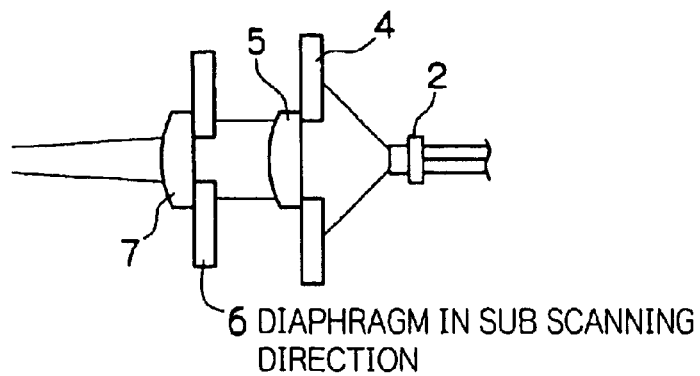
FIG. 25 is a schematic cross-sectional view showing the principal elements of the pre-deflection optical system (light source side) of the optical beam scanning device of the first embodiment along the sub scanning direction with a polygon mirror cover glass added.
Figure 26:
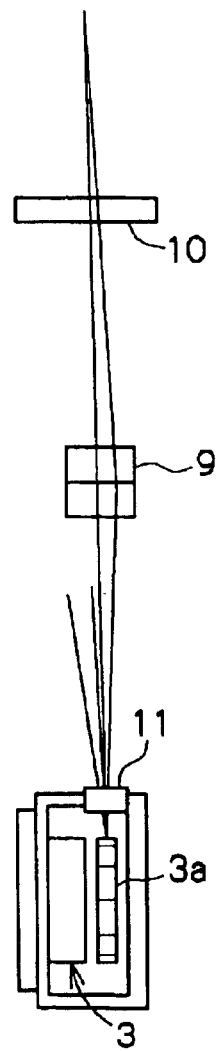
FIG. 26 is a schematic cross-sectional view showing the principal elements of a post-deflection optical system (image plane side) of the optical beam scanning device of the first embodiment along the sub scanning direction with a polygon mirror cover glass added.

FIGS. 24 to 26 show the state with a cover glass 11 for the polygon mirror 3 pollution counter measure and the sound proof counter measure added between the polygon mirror (deflector) 3 and the fθ lens 9 in the configuration of the optical beam scanning device 1 shown in FIGS. 1 to 3.

The optical beam scanning device 1A shown in FIGS. 24 to 26 has the number NN of the surfaces of the polygon mirror (deflector) 3 as 12, the cover glass 11 made of a glass, the fθ lens 9 made of a PMMA and the dust protection glass 10 made of a glass as the transmission type optical elements after deflection, with each refractive index as $n_1=1.514$ and $n_2=1.488$ and $n_3=1.514$. By calculating each transmissivity using the formula (16) with each approximated to the parallel flat plate, 1.032, 1.03 and 1.032 are obtained. The multiple δ of the transmissivities becomes $\delta=1.032\times1.03\times1.032=1.097$. Also here, with γ=γ in the formula (21), the reflection surface length/$e^{-2}$ diameter on the polygon mirror reflection surface is calculated.

In the case tgttr>1.1, a solution cannot be obtained by the formula (21). That is, however large $e^{-2}$ diameter on the polygon mirror reflection surface is made, a value with the light amount increased by 10% of the polygon mirror angle 0 cannot be obtained at the time of the maximum polygon mirror angle.

In the case tgttr=0.9, if the reflection surface length/$e^{-2}$ diameter on the polygon mirror reflection surface is 0.33, that is, the $e^{-2}$ diameter on the polygon mirror reflection surface is 3.04 times as much as the polygon reflection surface width or more, the light amount irregularity can be provided at 10% (p-p) or less. According to an image forming apparatus for half tone printing using the dither method or the binary error diffusion method with a large light amount irregularity tolerance value, the $e^{-2}$ diameter on the polygon mirror reflection surface can be provided as 3.04 times as much as the polygon reflection surface width or more.

In the case tgttr=0.95, if the reflection surface length/$e^{-2}$ diameter on the polygon mirror reflection surface is 0.26, that is, the $e^{-2}$ diameter on the polygon mirror reflection surface is 3.88 times as much as the polygon reflection surface width or more, the light amount ratio of the polygon mirror angle maximum value with respect to the polygon mirror polygon mirror angle 0 can be made 95% or more. Moreover, in the case tgttr=1.05, if the reflection surface length/$e^{-2}$ diameter on the polygon mirror reflection surface is 0.07, that is, the $e^{-2}$ diameter on the polygon mirror reflection surface is 13.93 times as much as the polygon reflection surface width or less, the light amount ratio of the polygon mirror angle maximum value with respect to the polygon mirror polygon mirror angle 0 can be made 105% or less. That is, by having the $e^{-2}$ diameter on the polygon mirror reflection surface/reflection surface length of 3.88 times or more and 13.93 times or less, the light amount irregularity can be provided at 5% (p-p) or less.

According to half tone printing by the screen-tone method, the multiple value error diffusion method, or the like of controlling the laser light emitting time in a pixel, or controlling the light amount, the $e^{-2}$ diameter on the polygon mirror reflection surface can be provided as 3.88 times or more and 13.93 times or less as much as the polygon reflection surface width.

In the case tgttr=1, if the reflection surface length/$e^{-2}$ diameter on the polygon mirror reflection surface is 0.18, that is, the $e^{-2}$ diameter on the polygon mirror reflection surface is about 5.47 times as much as the polygon reflection surface width, the light amount irregularity can be made to substantially 0.

As mentioned above, in the first embodiment, in order to restrain the light amount irregularity in the image plane, the polarization direction of the light beam incident on the deflector (polygon mirror) 3 is aligned to the main scanning direction of the reflection surface. That is, the incident light beam is provided as a P polarized light beam. The semiconductor laser (laser diode) 2 should be realized so as to satisfy the incident light beam condition.

The semiconductor laser in general is polarized by a 99% or more polarization ratio in the direction parallel to the junction, and the beam divergence angle in the polarization direction is smaller than the beam divergence angle in the direction perpendicular thereto. By using the semiconductor laser and aligning the polarization direction thereof with the main scanning direction of the deflector reflection surface, that is, in the direction in which it is P polarized, a P polarized light beam can be incident on the deflector, and the transmission type optical elements between the deflector and the image plane.

In the case of a single beam, conventionally, the direction perpendicular to the semiconductor laser junction with a large beam divergence angle has been provided as the main scanning direction, however, in the first embodiment, the direction parallel to the semiconductor laser junction is provided as the main scanning direction. At the time, the beam size is made larger in the sub scanning direction than in the main scanning direction on the finite focus lens 5 (or the collimator lens) so that in order to focus by the cylindrical lens 7, the distance between the deflector 3 and the cylindrical lens 7 should be-made larger.

In order to cope with that, a countermeasure of cutting the substantial beam size in the sub scanning direction by the diaphragm (aperture) 6 can be taken. In the case the light amount should not be wasted, in stead of narrowing the beam by the diaphragm 6, by shortening the beam size in the sub scanning direction by a prism having the apex angle in the sub scanning direction, or a beam expander comprising a combination of two cylindrical lenses having negative and positive powers in the sub scanning direction, or by expanding the beam size in the main scanning direction by a prism having the apex angle in the main scanning direction, or a beam expander comprising a combination of two cylindrical lenses having negative and positive powers in the main scanning direction, the optical efficiency is not lowered even though the cost is increased.

According to the optical beam scanning device of the first embodiment (including the modified embodiment thereof), since the polarization direction of the light beam incident on the deflector is provided as the P polarized light beam, the light amount irregularity in the image plane can be restrained.

In the case the polarization direction of the incident light beam is other than the above-mentioned, since the phase difference is generated due to the dependency of the incident angle by the P wave component and the S wave component if it is incident on the metal deflector reflection surface, according to the angle change of the deflector reflection surface, the longer (fast) axis direction (angle) is changed so as to have an elliptical polarization so that it is difficult to constantly maintain the light amount. However, according to the optical beam scanning device of the first embodiment, since the incident light beam includes only the P wave component, such a problem is not generated. Moreover, according to an ordinary lens, due to the influence of the internal distortion at the time of shaping, processing, or the like, a birefringence of having different refractive indices according to the polarization direction is generated. In the case the polarization direction is changed, the light collecting position, or the like is changed as well. As a result, a problem is involved in that the image forming characteristic is deteriorated so that the beam cannot be narrowed, the flare is enlarged, or the like. However, according to the optical beam scanning device of the first embodiment, since the polarization direction is constant, such a problem is not generated.

Second Embodiment

Next, a second embodiment of the present invention will be explained. The second embodiment is characterized in the optical beam scanning device.

Compared with the first embodiment, the optical beam scanning device of the second embodiment has a different semiconductor laser 2 configuration, and the configuration other than the semiconductor laser 2 is same as that of the first embodiment (see FIGS. 24 to 26). That is, the second embodiment is characterized in the configuration of the semiconductor laser 2 for having the P polarized light beam incident on the deflector (polygon mirror) 3.

Figure 27:
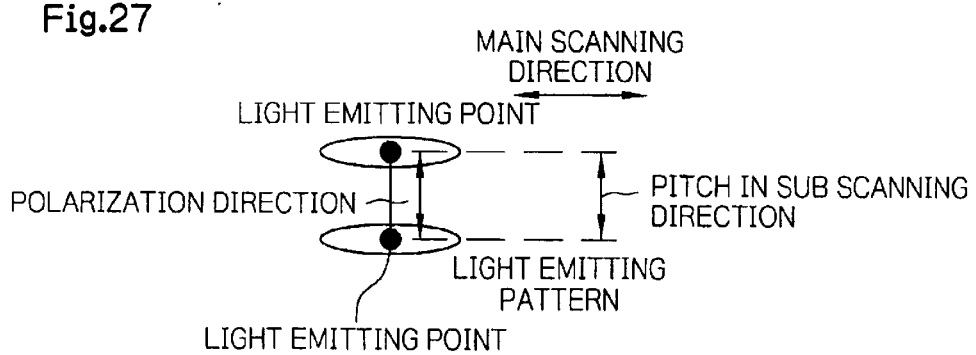
FIG. 27 is an explanatory diagram showing the conventional case with two light emitting points arranged side by side in the sub scanning direction using a semiconductor laser array.

According to the semiconductor laser array having two light emitting points, in the case the two light emitting points are disposed side by side in the sub scanning direction as shown in FIG. 27, the polarization direction on the deflector reflection surface becomes the S polarized light beam. Therefore, for example, as shown in FIG. 28, by having the light emitting point interval sufficiently large with respect to the sub scanning direction pitch of the semiconductor laser array and inclining in the main scanning direction, the P polarization component can be sufficiently large.

Furthermore, by having the light emitting point interval larger, an advantage that the thermal interference of the array light emitting parts with each other can hardly be generated, or the like can be provided.

Figure 28:
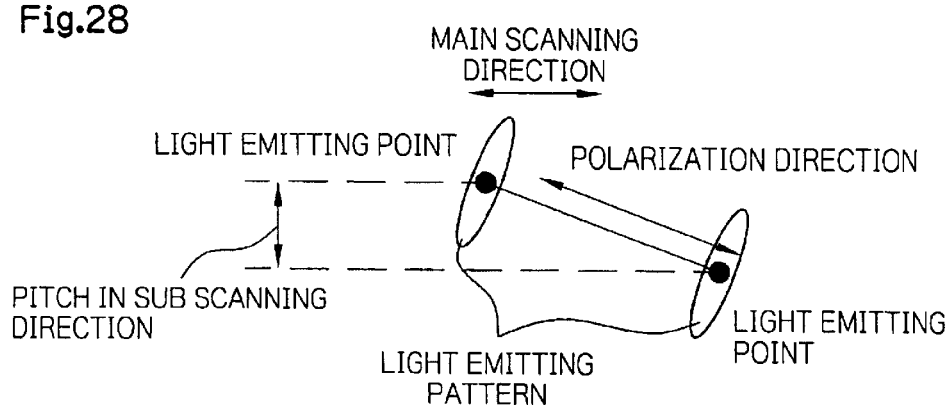
FIG. 28 is an explanatory diagram for an arrangement method of a semiconductor laser array in a second embodiment.
Figure 29:
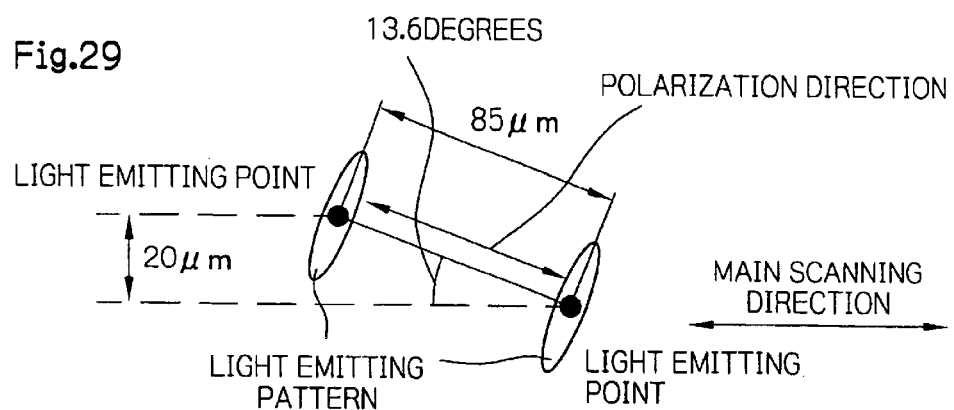
FIG. 29 is an explanatory diagram showing a specific example of the arrangement method of FIG. 28.

FIG. 29 shows a specific example of the arranging method of FIG. 28. The lateral magnification of the image plane with respect to the semiconductor laser portion in the sub scanning direction is provided at 2.11. In order to have the image plane 600 dpi pitch at 42.5 $\mu$m, the inter beam pitch in the sub scanning direction is provided at 20 $\mu$m. Since the semiconductor laser 2 has the sub scanning direction interval at 20 $\mu$m at the time of the light emitting point interval 85 $\mu$m, the inclination angle $\alpha$ of the polarization direction with respect to the main scanning direction at the time of linking the light emitting points is 13.6 degrees.

This denotes that the S polarization component intensity is 5.5%, and the P polarization component intensity is 94.5%.

Hereinafter, the optical beam scanning device 1A shown in FIGS. 24 to 26 explained as the modified example of the first embodiment will be discussed.

By using the above-mentioned formulae (16) to (18) to the parameter values mentioned above, the below-mentioned values with the formula (24) can be obtained.

$$\frac{Tp(\psi max, n_2)}{Tp(0, n_2)} = 1.030 \tag{24}$$

$$\frac{Tp(\psi max, n_1)}{Tp(0, n_1)} = \frac{Tp(\psi max, n_3)}{Tp(0, n_3)} = 1.032$$

$$\frac{Ts(\psi max, n_2)}{Ts(0, n_2)} = 0.962$$

$$\frac{Ts(\psi max, n_1)}{Ts(0, n_1)} = \frac{Ts(\psi max, n_3)}{Ts(0, n_3)} = 0.964$$

-continued $$\delta = \prod_{i=1}^{m} \frac{Tp, s(\psi\max, n_i, \alpha)}{Tp, s(0, n_i)} = \cos^2\alpha \prod_{i=1}^{m} \frac{Tp, (\psi\max, n_i)}{Tp(0, n_i)} +$$

$$\sin^2\alpha \prod_{i=1}^{m} \frac{Tp, (\psi\max, n_i)}{Tp(0, n_i)} = 1.086$$

In the case tgttr>1.05, a solution cannot be obtained by the formula (21). That is, however large $e^{-2}$ diameter on the polygon mirror reflection surface is made, a value with the light amount increased by 5% of the polygon mirror angle 0 cannot be obtained at the time of the maximum polygon mirror angle.

In the case tgttr=0.9, if the reflection surface length/$e^{-2}$ diameter on the polygon mirror reflection surface is 0.32, that is, the $e^{-2}$ diameter on the polygon mirror reflection surface is 3.17 times as much as the polygon reflection surface width or more, the light amount irregularity can be provided at 10% (p-p) or less. According to an image forming apparatus for half tone printing using the dither method or the binary error diffusion method with a large light amount irregularity tolerance value, the $e^{-2}$ diameter on the polygon mirror reflection surface can be provided as 3.17 times as much as the polygon reflection surface width or more.

In the case tgttr=0.95, if the surface length/$e^{-2}$ diameter on the polygon mirror reflection surface is 0.24, that is, the $e^{-2}$ diameter on the polygon mirror reflection surface is 4.10 times as much as the polygon reflection surface width or more, the light amount ratio of the polygon mirror angle maximum value with respect to the polygon mirror angle 0 can be made 95% or more. That is, by having the $e^{-2}$ diameter on the polygon mirror reflection surface of 4.10 times or more as much as the polygon reflection surface width, the light amount irregularity can be provided at 5% (p-p) or less.

According to half tone printing by the screen-tone method, the multiple value error diffusion method, or the like of controlling the laser light emitting time in a pixel, or controlling the light amount, the $e^{-2}$ diameter on the polygon mirror reflection surface can be provided as 4.10 times or more as much as the polygon reflection surface width.

In the case tgttr=1, if the reflection surface length/$e^{-2}$ diameter on the polygon mirror reflection surface is 0.16, that is, the $e^{-2}$ diameter on the polygon mirror reflection surface is about 6.06 times as much as the polygon reflection surface width, the light amount irregularity can be made to substantially 0.

For example, since the deflector (polygon mirror) 3 is made of an aluminum, in the case a light beam of other than the complete P polarization or the S polarization is input to the metal, the phase difference is generated to each of the P polarization and the S polarization so that it becomes an elliptical polarization to some extent. In this case, since the degree of the elliptical polarization is small, as to the effect, even by the calculation with the premise that the P polarization and S polarization components are in the above-mentioned ratio, there is not a large difference. However, it is further effective to dispose a polarizer for allowing passage of only the polarization direction component in the main scanning direction (P polarization component) in the optical path between the semiconductor laser and the deflector reflection surface.

Figure 30:
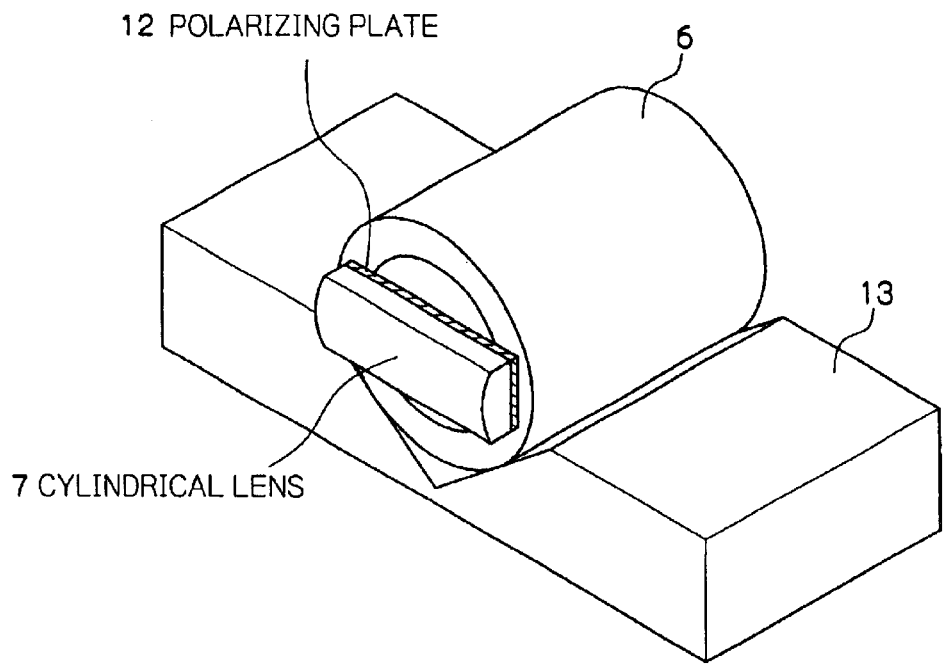
FIG. 30 is a schematic perspective view showing the state with a polarizer attached on a cylindrical lens in the second embodiment.

FIG. 30 shows the state with a polarizer 12 attached on the flat portion of the cylindrical lens 7.

Since the cylindrical lens 7 mounted on a cylindrical member serving also as the diaphragm 6 is supported by a V-shaped groove-like housing portion 13, it is provided rotatably around the rotation symmetrical axis of the cylindrical member. By rotating the cylindrical member 6 so as to have the beam size in the image plane to the minimum level, a positional relationship with the cylindrical surface of the cylindrical lens 7 symmetric axis coinciding with the main scanning direction can be obtained so that the angle of the polarizer 12 formed integrally with the cylindrical lens 7 can be provided accurately.

The light beam direction can be provided most stably with the position parallel to the light beam from the semiconductor laser 2. In order to have the flat surface here without increase of the number of the parts, it is preferable to have the flat surface of the cylindrical lens 7 on the upstream side and form the polarizer 12 on the surface. The configuration in FIG. 30 provided accordingly.

Third Embodiment

Next, a third embodiment of the present invention will be explained. The third embodiment is characterized in the image forming apparatus.

Figure 31:
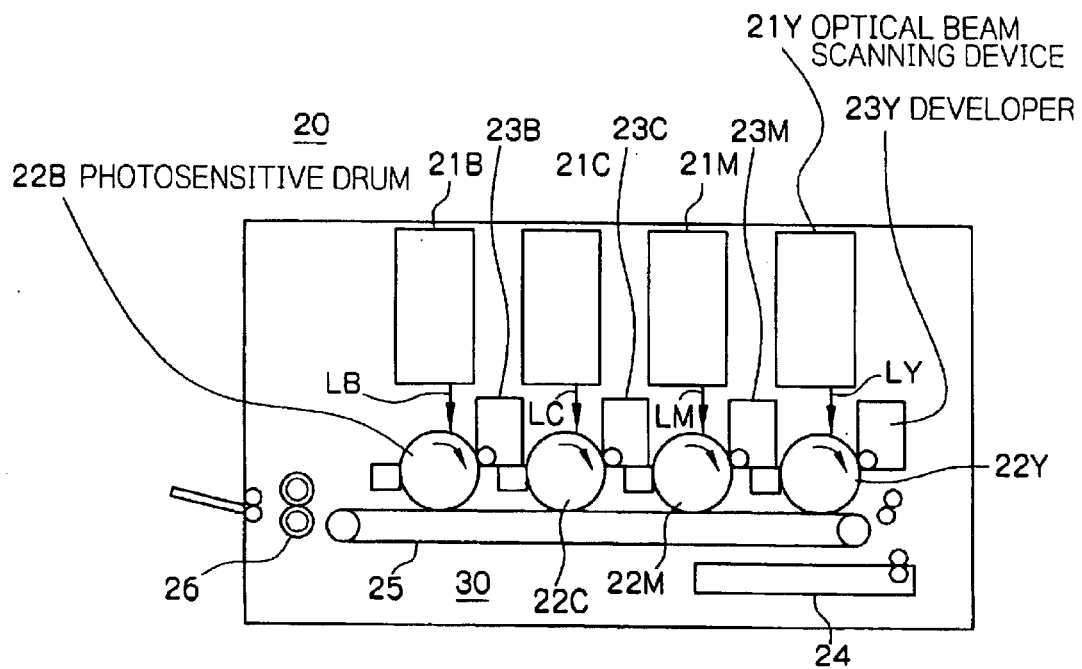
FIG. 31 is a schematic vertical cross-sectional view showing the configuration of a color image forming apparatus according to a third embodiment.

FIG. 31 is a schematic vertical cross-sectional view showing the configuration of the color image forming apparatus according to the third embodiment.

A color image forming apparatus 20 comprises optical beam scanning devices 21Y, 21M, 21C, 21B for yellow, magenta, cyan and black, and an image forming section 30. The optical beam scanning devices for yellow, magenta, cyan and black 21Y, 21M, 21C, 21B each directs the laser beam LY, LM, LC, LB to a photosensitive drums 22Y, 22M, 22C, 22B of the corresponding image forming section 30 so as to write a latent image of yellow, magenta, cyan and black components and form the toner images by the developers 23Y, 23M, 23C, 23B for developing the yellow, magenta, cyan and black toners. On to a paper fed out from a paper tray 24 and being conveyed by a conveyance belt 25, the toner images on the photosensitive drums 22Y, 22M, 22C, 22B are transferred successively, and fixed by a fixer 26 by heat and pressure so that the paper is discharged to the outside. Although a cleaner section, a charger, or the like are provided also in the photosensitive drums 22Y, 22M, 22C, 22B, description thereof is omitted.

The optical beam scanning devices 21Y, 21M, 21C, 21B for yellow, magenta, cyan and black having a configuration independent with each other (for those not having the optical elements commonly) are disposed side by side as shown in FIG. 31, with the main scanning direction (scanning line) provided parallel.

According to the third embodiment, as the optical beam scanning devices 21Y, 21M, 21C, for yellow, magenta and cyan, an optical beam scanning device having the configuration of the first embodiment is used. That is, an optical beam scanning device for having the light beam incident on the deflector 3 as the P polarized light beam by selecting the direction of the semiconductor laser 2 (2Y, 2M, 2C) is used.

In contrast, as the optical beam scanning device 21B for black, an optical beam scanning device having the configuration of the second embodiment is used. Among those explained for the second embodiment, one provided with a polarizer (see. FIG. 30) on the optical path reaching to the cylindrical lens 7 is used. The semiconductor laser 2 (2B) in the optical beam scanning device 21B for black has the two light emitting points disposed away by a predetermined pitch in the sub scanning direction as it is explained in the second embodiment. Moreover, as shown in FIG. 30, it is also possible to attach the polarizer 12 on the flat surface of the cylindrical lens 7 for providing the polarizer on the optical path reaching to the cylindrical lens 7.

According to the image forming apparatus of the third embodiment, since the polarization direction is substantially equal for the color components, in the main scanning direction position, the intensity ratio of the beams for producing the latent images for each color can be substantially constant so that a color image with little hue change can be obtained, and furthermore, high resolution black image can be achieved so that an image of high resolution can be obtained on the whole.

That is, in the case of producing an image of a plurality of colors by a plurality of scanning lines and superimposing the same, unless the intensity ratio of the beams for forming the images is constant, the hue is changed. Therefore, at the time of scanning a plurality of beams, it is preferable to have the same polarization direction. By having the polarization direction of a plurality of the beams as the P polarization on the deflector reflection surface, not only the light amount irregularity can be reduced but also the relative balance of the colors can be maintained so that the hue change can be prevented.

Moreover, in general, in the case of a color image, an image is produced with yellow, magenta, cyan and black for black image. It is known that the image quality is not much influenced even in the case the resolution of yellow, magenta and cyan is lower than the resolution of black at the time. Therefore, by increasing the number of beams for producing the black image and improving only the resolution thereof, compared with the case of increasing the number of beams for all the colors, a high resolution image and a color image can be provided while reducing the cost. Moreover, for the same resolution, it is also possible to increase the monochrome image printing speed to two times or four times as much as that of the color image outputting speed.

It is also possible to use the optical beam scanning devices of the second embodiment not only as the optical beam scanning device 21B for black, but also as the other color component optical beam scanning devices 21Y, 21M, 21C.

Fourth Embodiment

Next, a fourth embodiment of the present invention will be explained. The fourth embodiment comprises an optical beam scanning device 21B for black in the color image forming apparatus different from that of the third embodiment.

Figure 32:
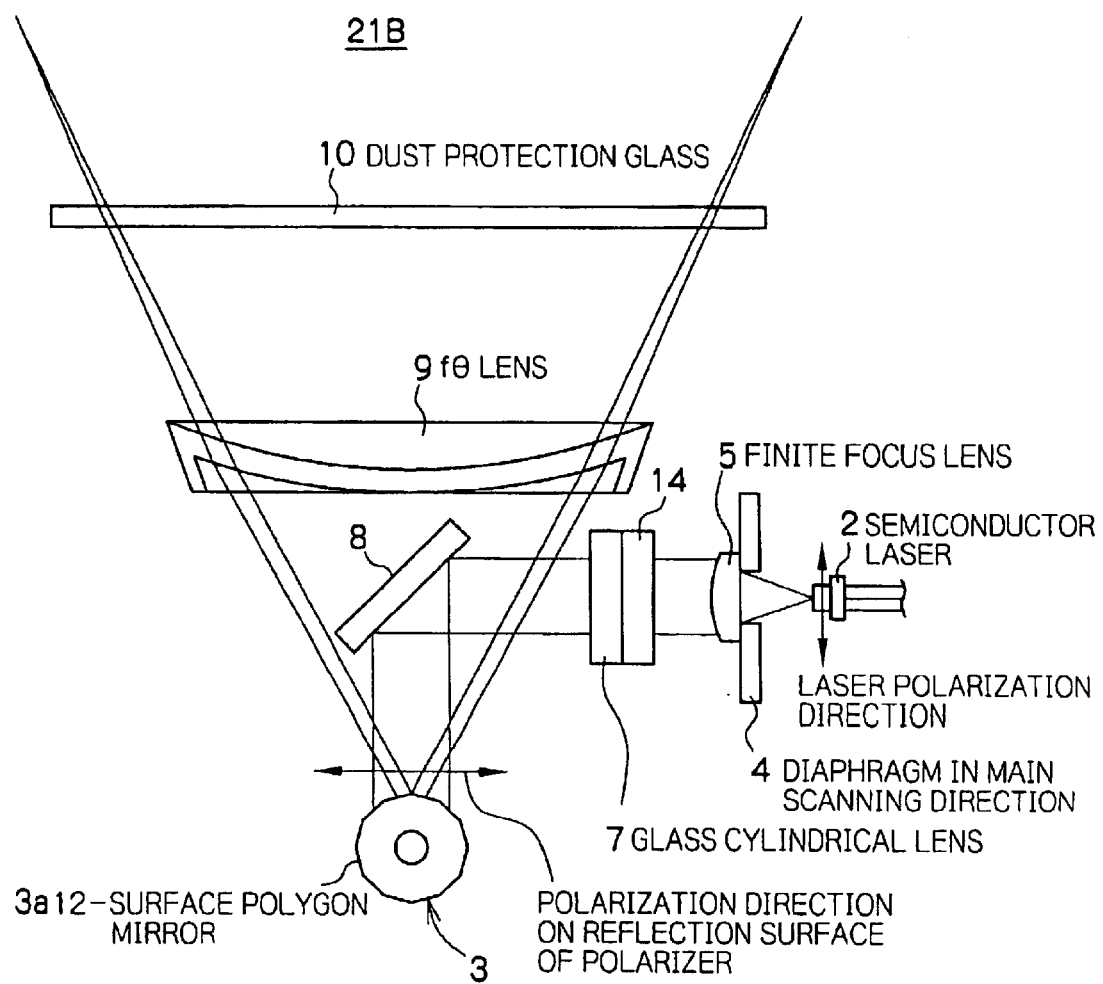
FIG. 32 is a schematic plane view of a black optical beam scanning device of a fourth embodiment along the main scanning direction.
Figure 33:
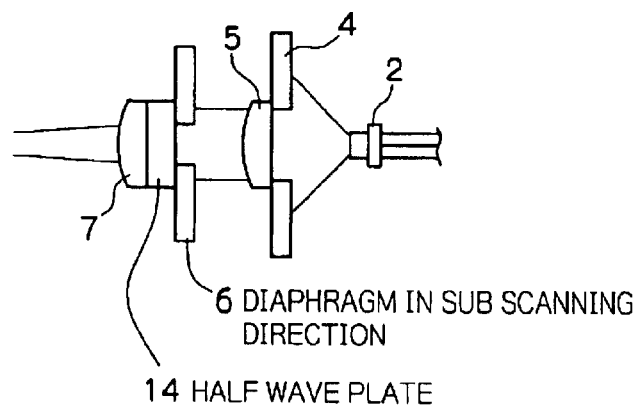
FIG. 33 is a schematic cross-sectional view showing the principal elements of the pre-deflection optical system (light source side) of the black optical beam scanning device of a fourth embodiment along the sub scanning direction.
Figure 34:
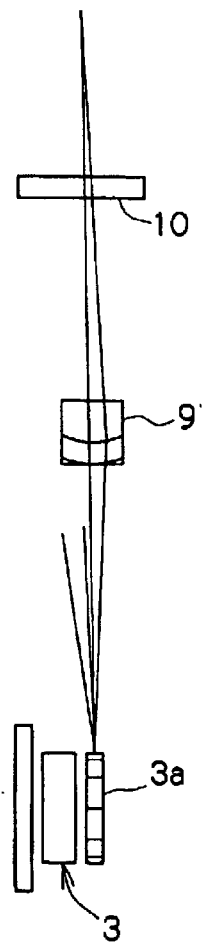
FIG. 34 is a schematic cross-sectional view showing the principal elements of the post-deflection optical system (image plane side) of the black optical beam scanning device of the fourth embodiment along the sub scanning direction.

FIGS. 32 to 34 are diagrams each corresponding to FIGS. 1 to 3, and show the configuration of the optical beam scanning device 21B for black in the fourth embodiment.

The optical beam scanning device 21B for black in the fourth embodiment comprises a half wave plate 14 (14B) on the optical path elongating from the semiconductor laser 2 (2B) to the deflector 3 (3B) instead of the polarizer 12 explained for the second embodiment. FIGS. 32 to 34 show an example with the half wave plate 14 bonded to the incident surface (flat surface) side of the glass cylindrical lens 7. The half wave plate 14 is used as means for rotating the polarization direction of the straight polarized light beam.

By disposing the half wave plate 14 such that the high retarder principal plane has the angle just halfway the main scanning direction and the incident polarization direction (13.6 degrees/2=6.8 degrees), the polarized light beam after being output from the half waveplate 14 has the polarization direction thereof coinciding with the main scanning direction. Thereby, the incident light beam to the deflector 3 can be provided accurately as the P polarized light beam so that generation of the light amount irregularity can be restrained, the light amount ratio at the time the main scanning direction position of the units for each color is same can be provided constantly, and furthermore, it contributes to provide the hue constantly.

FIG. 35 is a schematic perspective view showing the details in the vicinity of the glass cylindrical lens 7. The half wave plate 14 is attached or deposited on the flat surface portion of the cylindrical lens 7. In the case the half wave plate 14 is formed by the deposition, the deposition material is a birefringence substance. Since the cylindrical lens 7 mounted on a cylindrical member serving also as the diaphragm 6 is supported by a V-shaped groove-like housing portion 13, it is provided rotatably around the optical axis of the cylindrical member 6. By rotating the cylindrical member 6 so as to have the beam size in the image plane to the minimum level, a positional relationship with the cylindrical surface of the cylindrical lens 7 symmetric axis coinciding with the main scanning direction can be obtained.

The half wave plate 14 is for providing the phase difference proportional to the optical path length of a light beam proceeding in the wave plate. Therefore, in the case the angle formed by the light beam and the normal of the wave plate differs depending on the position, the phase difference is changed depending on the position so that the straight polarization cannot be obtained. The light beam direction can be provided most stably with the position parallel to the light beam from the semiconductor laser 2. In order to have the flat surface here without increase of the number of the parts, it is preferable to have the flat surface of the cylindrical lens 7 on the upstream side and form the half wave plate 14 on the surface.

As mentioned above, the half wave plate 14 of the birefringence substance is formed on the cylindrical lens 7 surface integrally, with the cylindrical lens 7 with the half wave plate 14 formed rotatably around the optical axis for the light beam passage as the rotation center. Thereby, by providing the angle of the half wave plate 14, the polarization direction of the polygon mirror incident beam can be set accurately without the need of adding the highly sophisticated parts or adjustment.

In order to accurately control the polarization direction, it is necessary to provide the retarder principal plane direction of the birefringence substance accurately. For example, in the case of one having the birefringence substance attached or deposited on the glass plate, it is necessary to provide the glass plate itself having the accurate parallelism, and improve the accuracy of the housing member for positioning the glassplate. Otherwise, it is necessary to measure the light amount in a plurality of portions in the image forming surface of the scanning optical system, and adjust the rotation of the glass plate with the birefringence substance attached based on the measurement result.

In contrast, for the process of the cylindrical lens 7, a groove is formed accurately in a cylindrical jig, and the glass plate with the size provided accurately is fitted therein for cutting and executing the polishing process while rotating the jig. Furthermore, in the case it is disposed on the housing, since the beam profile is ruined if the symmetric axis of the cylindrical surface of the cylindrical lens is inclined, according to a highly sophisticated scanning optical system, it is adjusted with the optical axis provided as the center while observing the beam profile. By providing the cylindrical lens and the birefringence substance integrally, a glass plate with the size provided accurately, or the like is not required additionally. Furthermore, even in the case the size of the housing for supporting the cylindrical lens is not provided accurately, since the angle around the optical axis of the cylindrical lens can be provided accurately at the time of the beam profile adjustment, the birefringence substance retarder principal plane direction can be provided accurately.

That is, it is preferable to provide the half wave plate 14 as shown in FIG. 35.

Next, the reason why the half wave plate 14 is disposed such that the retarder principal plane has the angle just halfway the main scanning direction and the incident polarization direction (13.6 degrees/2=6.8 degrees) will be explained.

The half wave plate 14 has a function for changing the orientation of polarization plane of the straight polarized light beam. The half wave plate 14 is for generating the phase difference of $\pi$ between the retarder principal plane and the delay axis. In the case the incident beam is polarized by angle $\alpha/2$ with respect to the retarder principal plane, the output beam rotates around the retarder principal plane by $\alpha$. That is, it has a function for rotating the polarization direction by $\alpha$.

The optical beam scanning device 21B for black of the fourth embodiment is a modification of the optical beam scanning device 1A of the second embodiment, with the polarization direction of the light beam output from the semiconductor laser 2 inclined by 13.6 degrees with respect to the main scanning direction. Therefore, by disposing the half wave plate 14 such that the retarder principal plane has the angle just halfway the main scanning direction and the incident polarization direction (13.6 degrees/2=6.8 degrees), the polarization direction of the light beam output from the half wave plate 14 can coincide with the main scanning direction.

Also in the fourth embodiment as in the third embodiment, since the polarization direction of the incident light beam onto the deflector is aligned for the color components (P polarization), the same effect can be obtained.

The technological idea common to the third embodiment and the fourth embodiment will be explained.

The third embodiment and the fourth embodiment are an image forming apparatus comprising a plurality of light sources, with at least one of a plurality of the light sources comprising a semiconductor laser having different number of light emitting points from the others so that the absolute values of the angles with respect to the main scanning direction of the polarization direction of all the light beams on the reflection surface of the deflector are same.

Conventionally, since the same semiconductor lasers are disposed with the spreading angle enlarged in the same direction (in most cases in the main scanning direction) and used, they are arranged in the same direction and used that way.

For example, in the case of a semiconductor laser array, the inclination angle of the line linking the light emitting points of the semiconductor laser array with respect to the main scanning direction is defined to be $\sin^{-1}$ (P/Larray) according to the pitch P in the sub scanning direction set on the plane including the light emitting points for having a predetermined sub scanning pitch on the image plane, and the light emitting point interval of the semiconductor laser array Larray. At the time, the polarization direction is provided in the same direction as the line linking the light emitting points (see FIGS. 27 and 28). For example, by providing a laser array with the polarization direction inclined with respect to the main scanning direction by $\sin^{-1}$ P/Larray) accordingly, and providing a semiconductor laser having a light emitting point with the polarization direction (that is, the chip junction layer) inclined by $\pm\sin^{-1}$ (P/Larray) so as to have the same angle absolute value with respect to the rain scanning direction, or having the same polarization direction angle absolute value with respect to the main scanning direction on the deflector, by the polarizer or the wave plate, the ratio of the P wave component and the S wave component can be same. Thereby, the optical efficiency ratio of the beams can be same regardless of the deflection angle so that the hue can be maintained constantly in the case a large number of colors produced by the semiconductor lasers are superimposed.

As it is apparent from the various kinds of the formulae explained in the first embodiment, in the case the absolute values of the polarization direction angle of the light beam incident on the reflection surface of the deflector are same, the same light amount irregularity with respect to the deflection angle in the image plane can be provided.

Moreover, the wave plate (or the polarizer) is used only in the optical beam scanning device 21B for black based on the following idea.

In order to minimize the number of an expensive wave plate, it is preferable to combine only one which is different from the others.

In the case of a laser having a light emitting point, depending on which aspect is regarded important, it is preferable to (i) adopt the configuration of having the polarization direction in the sub scanning direction in the case miniaturization of the pre-deflection optical system is regarded important, and it is preferable to (ii) adopt the configuration of having the polarization direction in the vicinity of the main scanning direction in the case a part of the incident light beam is reflected by the reflection surface and the light amount irregularity is to be minimized.

In contrast, the polarization direction of the semiconductor laser array is determined by the laser array light emitting point interval, and the pitch of the arrangement in the sub scanning direction (it is determined by the lateral magnification in the sub scanning direction of the pre-deflection and the post-deflection optical systems, and the setting beam pitch in the sub scanning direction in the image plane) Therefore, the polarization direction of the laser array can be set freely so that it can coincide with the polarization direction output from the laser having a light emitting point by the wave plate.

According to the above-mentioned configuration, the pre-deflection optical system can be miniaturized. By minimizing the number of the wave plate, it is preferable to combine only one which is different from the others.

Of course the polarizer and the wave plate can be adopted also for the optical beam scanning devices 21Y, 21M, 21C for yellow, magenta and cyan (see the fifth embodiment to be explained later).

Moreover, it is also conceivable to operate the polarization direction using a quarter wave plate as the wave plate.

However, by using the half wave plate instead of the quarter wave plate, deterioration of the image forming characteristic by the birefringence in the lens, which is problematic in the case of the circular polarization can be restrained. In the case of the circular polarization, the polarization direction is changed at a high speed so that the focal position is changed according to the time in the case there is a birefringence. In the case it is generated while forming a dot, the energy distribution accumulated on the photosensitive member is spread.

Fifth Embodiment

Next, a fifth embodiment of the present invention will be explained. The fifth embodiment relates to a color image forming apparatus mentioned above shown in FIG. 31.

According to the fifth embodiment, not only the optical beam scanning device 21B for black, but also the optical beam scanning devices 21Y, 21M, 21C for yellow, magenta, cyan have the configuration comprising the half wave plate 14 as shown in FIG. 35.

Moreover, according to the fifth embodiment, the semiconductor laser 2 (2B) for the optical beam scanning device 21B for black has the configuration shown in FIG. 36A (laser posture). In contrast, the semiconductor laser 2 (2Y, 2M, 2C) for the optical beam scanning devices 21Y, 21M, 21C for yellow, magenta, cyan have the configuration shown in FIG. 36B (laser arrangement)

In the semiconductor laser 2B for the optical beam scanning device 21B for black, the two light emitting point interval is for example 20 μm, and the polarization direction of the output light beam is in the sub scanning direction. The polarization direction of the output light beam of the semiconductor lasers 2Y, 2M, 2C of the optical beam scanning devices 21Y, 21M, 21C for yellow, magenta, cyan is also in the same sub scanning direction. As to the relationship between the number of the light emitting points of the semiconductor laser 2B for black, and the number of the light emitting points of the semiconductor lasers 2Y, 2M, 2C for yellow, magenta, cyan, the numbers of the light emitting points of the other laser arrays are a divisor of the number of the light emitting points of the laser array with the largest number of the light emitting points. The number of the light emitting points of the semiconductor lasers 2Y, 2M, 2C for yellow, magenta, cyan may be same as those for black.

As mentioned above, according to the fifth embodiment, not only the optical beam scanning device 21B for black, but a half wave plate 14 (14Y, 14M, 14C, 14B) are bonded on the incident surface side of the cylindrical lens 7 (7Y, 7M, 7C, 7B) also for the optical bean scanning devices 21Y, 21M, 21C for yellow, magenta, cyan (see FIG. 35).

The half wave plate 14 (14Y, 14M, 14C, 14B) is disposed such that the retarder principal plane has the angle just halfway the main scanning direction and the incident polarization direction (90 degrees/2=45 degrees). Therefore, after being output from the half wave plate 14 (14Y, 14M, 14C, 14B), the polarization direction coincides with the main scanning direction. Thereby, all the beams become the P polarized light beam with respect to the deflector 3 (3Y, 3M, 3C, 3B) so that miniaturization of the pre-deflection optical system, reduction of the light amount irregularity, and evenness of the light amount ratio at the same main scanning direction position of the units can be achieved.

The reason why the above-mentioned configuration is adopted will be explained.

The polarization direction of the semiconductor laser 2 is oriented in the direction same as the one with a smaller beam divergence angle. In the case one having a beam divergence angle in one side Θmain in the main scanning direction is used among the light beams output from the semiconductor laser 2, the beam width ωmain in the main scanning direction after passing through the collimator lens having a focal distance f, or the finite focus lens 5 is represented by the formula (25). The formula (25) denotes that for obtaining the same ω, f can be made smaller with larger Θ so that miniaturization of the collimator lens or the finite focus lens 5 can be achieved.

$$\omega \text{main} \approx f \times \tan(\Theta \text{ main}) \quad (25)$$

Furthermore, the beam width after passing through the collimator lens or the finite focus lens (cylindrical lens 7) in the sub scanning direction is represented by the formula (26).

$$\omega \text{ sub} \approx f \times \tan(\Theta \text{ sub}) \quad (26)$$

The distance for focusing the beam on the reflection surface of the deflector 3 by a predetermined converging angle Θsubpol (since the sub scanning beam size in the image plane is determined by the converging angle and the sub scanning direction magnification of the post-deflection optical system, in the case the post-deflection optical system and the sub scanning direction beam size are determined, Θsubpol is set accordingly),that is, the distance from the cylindrical lens 7 to the reflection surface of the deflector 3 Lcyl-pol is represented by the formula (27). The formula (27) denotes that the distance between the cylindrical lens and the deflector can be made smaller with a smaller Θsub.

$$L \text{ cyl-pol} \approx \omega \text{ sub}/\tan(\Theta \text{ subpol}) \approx f \times \tan(\Theta \text{ sub})/\tan(\Theta \text{ subpol}) \quad (27)$$

As heretofore mentioned, it is learned that a larger Θmain and a smaller Θsub are advantageous for the miniaturization. If the semiconductor laser 2 is oriented to the direction, the polarization direction is in the sub scanning direction. By disposing the semiconductor laser 2 such that the one with a larger light emitting angle is oriented in the main scanning direction (at the time, the polarization direction is in the sub scanning direction), and disposing the half wave plate 14 in a state with the retarder principal plane inclined by 45 degrees with respect to the polarization direction of the incident beam for having the polarization direction in the main scanning direction, the polarization direction can be provided as the P polarization on the reflection surface of the deflector while achieving the miniaturization.

Sixth Embodiment

Next, a sixth embodiment of the present invention will be explained. The sixth embodiment relates to a color image forming apparatus mentioned above shown in FIG. 31. The sixth embodiment is a modification of the above-mentioned third embodiment.

According to the above-mentioned third embodiment, the semiconductor laser (semiconductor laser array) of the optical beam scanning device 21B for black has the two light emitting points, with the direction linking the two light emitting points provided in the polarization direction of the output light beams, which is inclined by 13.6 degrees with respect to the main scanning direction. In contrast, the semiconductor lasers of the optical beam scanning devices 21Y, 21M, 21C for yellow, magenta, cyan have a light emitting point, with the polarization direction of the output light beam coinciding with the main scanning direction.

On the other hand, as shown in FIGS. 37A and 37B, according to the sixth embodiment, the semiconductor laser for the optical beam scanning device 213 for black is same as that in the third embodiment, and the semiconductor lasers for the optical beam scanning devices 21Y, 21M, 21C for yellow, magenta, cyan have the polarization direction of the light beam output from the light emitting point inclined by 13.6 degrees with respect to the main scanning direction. That is, the single beam semiconductor laser for the optical beam scanning devices 21Y, 21M, 21C for yellow, magenta, cyan has the junction surface direction thereof set so as to have the polarization direction in the same direction as the polarization direction of the semiconductor laser for black (semiconductor laser array).

Thereby, the same polarization direction is provided and the same power ratio is provided at the same position in the main scanning direction so that the hue irregularity depending on the position can be prevented.

In the case the incident light beam width is larger than the polygon mirror reflection surface width, the number of the transmission type optical systems is small, and the transmissivity increase ratio is desired to be made larger with respect to the deflection angle in the transmission type optical systems excluding the S polarization component, in order to delete only the S polarization component, it is further effective to dispose a polarizer for allowing passage of the polarization direction component only in the main scanning direction in the optical path between the semiconductor laser and the reflection surface of the deflector for all the color components. Moreover, instead of the polarizer, the half wave plate may be utilized.

Furthermore, in the case the polarization direction of the light beam output from the semiconductor laser (semiconductor laser array) of the optical beam scanning device 21B for black is inclined by 13.6 degrees with respect to the main scanning direction, the same effect as mentioned above can be obtained by inclining the polarization direction of the light beam output from the semiconductor lasers of the optical beam scanning devices 21Y, 21M, 21C for yellow, magenta, cyan by −13.6 degrees with respect to the main scanning direction.

Seventh Embodiment

Next, a seventh embodiment of the present invention will be explained. The seventh embodiment relates to a color image forming apparatus mentioned above shown in FIG. 31. Compared with the above-mentioned color image forming apparatus of the sixth embodiment, the seventh embodiment relates to a color image forming apparatus capable of dealing with also high speed image formation.

Figures 38A, 38B:
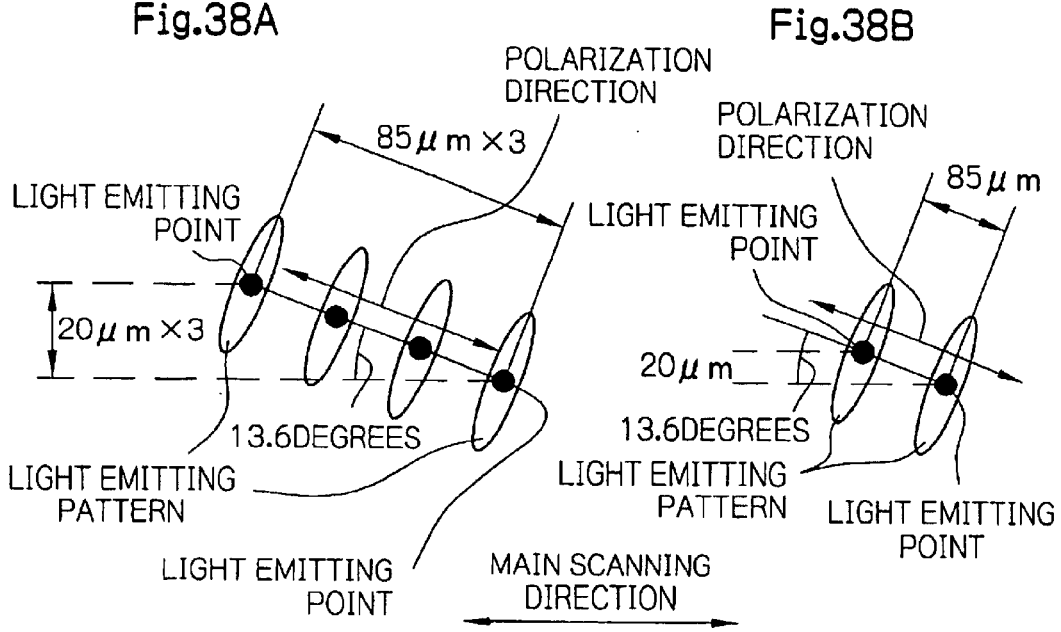
FIGS. 38A and 38B are explanatory diagrams for a semiconductor laser of a seventh embodiment, in which FIG. 38A relates to a semiconductor laser (semiconductor laser array) for a black optical beam scanning device, and FIG. 38B relates to a semiconductor laser (semiconductor laser array) for yellow, magenta and cyan optical beam scanning devices.

As shown in FIG. 38A, the semiconductor laser (semiconductor laser array) for the optical beam scanning device 21B for black has four light emitting points disposed by equal interval, with the direction linking the four light emitting points provided in the polarization direction of the output light beam, which is inclined by 13.6 degrees with respect to the main scanning direction. In contrast, as shown in FIG. 38B, the semiconductor lasers (semiconductor laser arrays) for the optical beam scanning devices 21Y, 21M, 21C for yellow, magenta, cyan have two light emitting points, with the direction linking the two light emitting points provided in the polarization direction of the output light beam, which is inclined by 13.6 degrees (it may be −13.6 degrees) with respect to the main scanning direction.

The light emitting point pitch of the semiconductor laser array for black and the light emitting point pitch of the semiconductor laser arrays for yellow, magenta, cyan are provided equally.

Since the polarization direction same, the same power ratio is provided at the same position in the main scanning direction so that the hue irregularity depending on the position can be prevented.

Also in the seventh embodiment, as to the numbers of the light emitting points of the semiconductor laser arrays, it is different in at least one optical beam scanning device from those of the others, and the numbers of the light emitting points of the other semiconductor arrays are a divisor of the number of the light emitting points of the semiconductor laser array with the largest number of the light emitting points.

Eighth Embodiment

Next, an eighth embodiment of the present invention will be explained. The eighth embodiment relates to a color image forming apparatus mentioned above shown in FIG. 31. Like the above-mentioned color image forming apparatus of the seventh embodiment, the eighth embodiment relates to a color image forming apparatus capable of dealing with also high speed image formation.

Figures 39A, 39B:
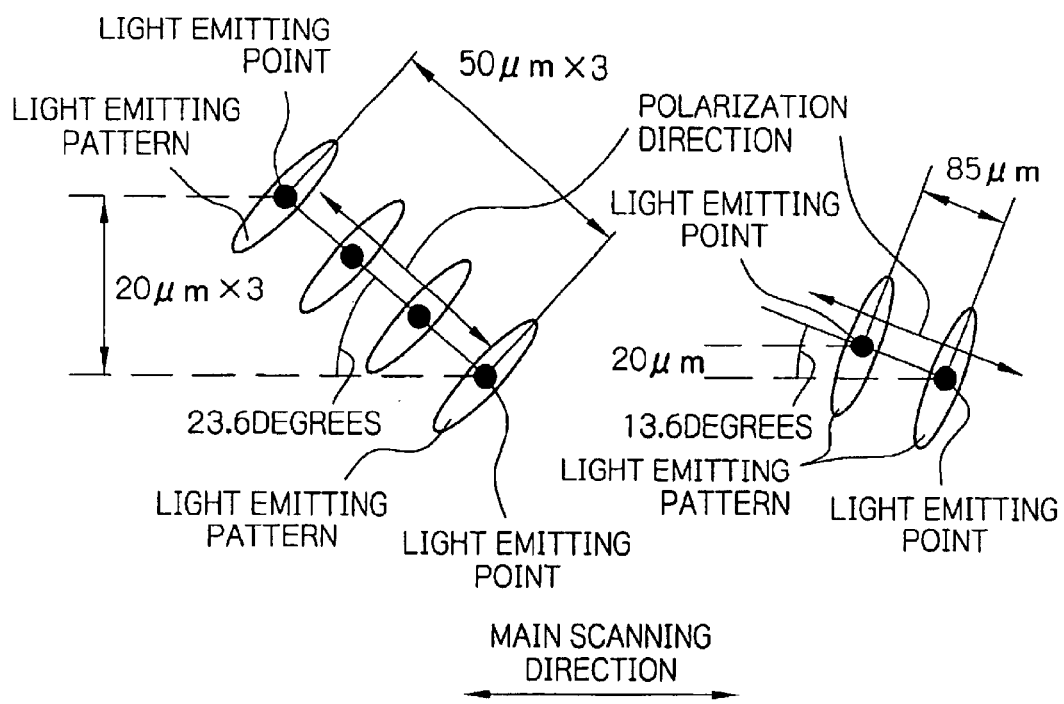
FIGS. 39A and 39B are explanatory diagrams for a semiconductor laser of an eighth embodiment, in which FIG. 39A relates to a semiconductor laser (semiconductor laser array) for a black optical beam scanning device, and FIG. 39B relates to a semiconductor laser (semiconductor laser array) for yellow, magenta and cyan optical beam scanning devices.

As shown in FIG. 39A, the semiconductor laser (semiconductor laser array) of the optical beam scanning device 21B for black has four light emitting points disposed by an equal interval (pitch is 50 µm), with the direction linking the four light emitting points provided in the polarization direction of the output light beam, which is inclined by 23.6 degrees with respect to the main scanning direction. In contrast, as shown in FIG. 39B, the semiconductor lasers (semiconductor laser arrays) of the optical beam scanning devices 21Y, 21M, 21C for yellow, magenta, cyan has two light emitting points of a 85 µm pitch, with the direction linking the two light emitting points provided in the polarization direction of the output light beam, which is inclined by 13.6 degrees (it may be −13.6 degrees) with respect to the main scanning direction.

According to the optical beam scanning device 21B for black, the half wave plate 14 is bonded to the cylindrical lens 7 as shown in FIG. 35. The optical beam scanning devices 21Y, 21M, 21C for yellow, magenta, cyan are not provided with-the half wave plate.

Here, the half wave plate 14 (14B) in the optical beam scanning device 21B for black is disposed such that the retarder principal plane has the angle just halfway the polarization direction of yellow, magenta, cyan and the incident polarization direction ((23.6 degrees+13.6 degrees)/2=18.6 degrees). Thereby, the beam for black can be oriented in the same polarization direction as that for yellow, magenta cyan at the time when it is incident on the deflector 3 (3B). Therefore, after being output from the half wave plate 14, the polarization direction is identical for all the color components. Thereby, the same power ratio is provided for all the color components at the same position in the main scanning direction so that the hue irregularity depending on the position can be prevented.

As mentioned above, it is preferable that the half wave plate 14 in the optical beam scanning device 21B for black is formed integrally with the flat surface side of the cylindrical lens 7 in terms of reducing the number of the parts, and providing accurately the angle of the wave plate. As long as it is between the cylindrical lens 7 and the deflector 3, another position can be adopted as well.

The angle of the half wave plate 14 (14B) in the optical beam scanning device 21B for black is not limited to the above-mentioned example, and it may be as follows. That is, the half wave plate 14 (14B) may be disposed such that the retarder principal plane has the angle just halfway the polarization direction for yellow, magenta, cyan moved symmetrically with respect to the main scanning direction, and the incident polarization direction ((23.6 degrees−13.6 degrees)/2=5 degrees). In this case, the polarization direction of the black beam has the same angle absolute value with respect to the main scanning direction as that of the other colors, with the symmetrical inclination with respect to the main scanning direction.

Accordingly, even in the case only the polarization direction of the light beam incident on the reflection surface of the deflector for black is different from the others, since the ratio of the S polarization component and the P polarization component is same, the same light amount distribution can be obtained in the image plane also by this method unless an element for drastically displacing the phase of the S polarization component and the P polarization component is disposed halfway.

Even in the case the magnification in the sub scanning direction is same, if the numbers of the light emitting points of the semiconductor lasers differ, the semiconductor lasers having different light emitting point pitches can be used. In such case, as in-this embodiment, the angle formed by the line linking the light emitting points and the main scanning direction becomes different. In such a case, the light amount irregularity can be restrained by forming a wave plate in the cylindrical lens disposed in the optical path output from the semiconductor laser having a smaller number of the light emitting points, and setting the longer axis direction of the wave plate so as to have a polarization angle in the same direction as the light beams from the other semiconductor lasers on the reflection surface of the deflector.

Other Embodiments

Although the above-mentioned third to eighth embodiments describe the cases with the present invention adopted in the color image forming apparatus having optical beam scanning devices independent with each other for each color component, the present invention can also be adopted in a color image forming apparatus for utilizing a part of the configuration of the optical beam scanning devices for a plurality of color components.

For example, the technological idea of the present invention can also be adopted in an image forming apparatus comprising an optical beam scanning device for having laser beams incident from two directions on only one deflector, using two surfaces of the polygon mirror surfaces, and using a post-deflection optical system corresponding to each light beam, or an image forming apparatus comprising an optical beam scanning device using only one deflector, and using a part or the entirety of optical elements after scanning deflector so as to obtain the same effect as in the above-mentioned embodiments.

That is, even in the case of an optical beam scanning device for having a light beam with a width in the main scanning direction narrower than the width of the reflection surface of the deflector in the main scanning direction incident so as to be reflected and deflected by the reflection surface of the deflector, and focusing the beam on the surface to be scanned by the optical means including the transmission type optical member (so-called under fill method optical beam scanning device), the same effect can be obtained by having the light beam incident on the deflector substantially as the P polarized light beam as described in the above-mentioned embodiments (including the case of having the same absolute value of the angle with respect to the main scanning direction) in terms of evenly maintaining the light amount ratio by the position in the main scanning direction. However, in the case the polarization direction of the incident light beam to the polygon mirror reflection surface is provided in the main scanning direction, the image plane power becomes larger on a larger polygon mirror angle. In this case, rather than having the P polarized light beam, by aligning the polarizing direction in the vicinity of 40 degrees from main scanning direction, the light amount irregularity can be restrained at the time generation of the phase difference between the P polarization component and the S polarization component by the metal mirror reflection including the polygon mirror is in a predetermined condition (the polygon mirror deflection angle is not large, the phase difference generated by the reflection by the halfway metal surface is close to ±180 degrees, or the like)

Moreover, according to the optical beam scanning devices in the other embodiments, since the deflector is used commonly, the scanning line moving amount in the sub scanning direction is same. Therefore, according to a method of combining laser arrays having different number of the light emitting points as mentioned in the seventh and eighth embodiments, it is necessary to use the same number of the light emitting points as the minimum number of the light emitting points without writing data by the other ones (such a problem is not involved in the case of having one light emitting point for the yellow, magenta and cyan beams, and providing the semiconductor laser array for black). In this case, although a color high resolution cannot be expected, it is advantageous in that a high speed printing operation can be achieved only in the case of a monochrome mode (black mode).

In order to avoid the same, there is a method of doubling the sub scanning direction lateral magnification of the pre-deflection optical system for yellow, magenta and cyan n the seventh and eighth embodiments. Therefor, the cylindrical lens focal distance on the upstream side of the deflector and the distance from the polygon mirror reflection point to the cylindrical lens image side principal point can be doubled. This method is advantageous in that the laser arrays with the same interval between the light emitting points can be used.

Furthermore, among the above-mentioned embodiments, in the case of using the polarizer 12 for transmitting only the same polarization direction, or the half wave plate 14 of the same retarder principal plane direction, the number of the parts can be cut back by attaching or depositing the polarizer or the half wave plate to the element for having all the beams pass through, such as the polygon mirror cover glass disposed between the cylindrical lens having the power in the sub scanning direction and the polygon mirror, or the like.

Figure 40:
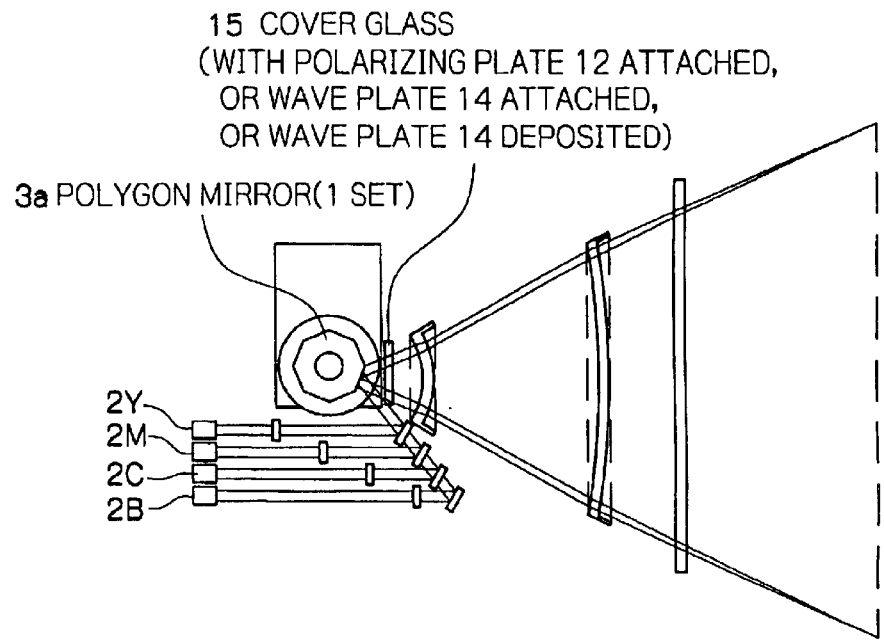
FIG. 40 is a schematic plane view for explaining the arrangement position of the wave plate, the polarizer, or the like, in the optical beam scanning device for inputting light beams from a plurality of light sources onto the same reflection surface of the deflector.

FIG. 40 shows the state with the polarizer 12, or the half wave plate 14 bonded to the polygon mirror cover glass 15. This is for having the light beams from a plurality of the light sources 2Y, 2M, 2C, 2B incident on different positions of a polygon mirror 3 by different angles. Before being incident on the polygon mirror, the polygon mirror cover glass 15 is provided, with the cover glass 15 bonded with the polarizer 12 or the half wave plate 14. Thereby, although the accuracy is poorer than the case of mounting the polarizer 12 or the half wave plate 14 on the cylindrical lens 7, it is advantageous in terms of the cost. Either in the case the semiconductor laser is an array, or one having a light emitting point, as long as the polarization direction is aligned, the polarization direction of the light beam incident on the polygon mirror can be set optionally by the common polarizer 12 or the half wave plate 14.

Moreover, by inserting the quarter wave plate instead of the polarizer in the optical path, although disadvantages of the irregularity in the main scanning direction depending on the position and the image forming characteristic deterioration are involved, if it is in the tolerance range, the output light beams becomes a circularly polarized light beam regardless of the polarization direction of the incident light beam so that the light amount ratio of different beams at the same position can be maintained constantly.

Furthermore, in the case the semiconductor laser angle is irregular, it is preferable to attach the polarizer 12 on the polygon mirror cover glass 15 before being incident on the polygon mirror instead of the wave plate 14.

Hereafter, a method capable of achieving a high resolution and restraining the light amount irregularity while using the same optical portions (such as the cylindrical lens of the pre-deflection optical system) in the case the rotation speed of the deflector is same and the semiconductor laser arrays having different numbers of the light emitting points are included in the light sources for each color component even in the case of having independent optical beam scanning devices for each color component (see FIG. 31), or an optical beam scanning device of a type of using the deflector commonly for a plurality of beams of different color components will be explained. According to the method, the number of the light emitting points of the other laser arrays is a divisor of that of the semiconductor array of the largest number of the light emitting points, and furthermore, the pitch between the light emitting points of the semiconductor laser arrays having the number of the light emitting points other than the largest number of the light emitting points may be a multiple of the pitch between the light emitting points of the semiconductor laser array of the largest number of the light emitting points (largest number of the light emitting points/number of the light emitting points of the semiconductor laser array).

Figure 41A:
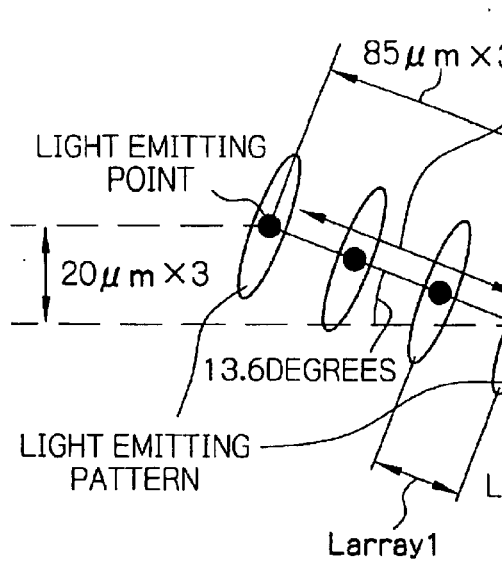
FIGS. 41A and 41B are explanatory diagrams for a semiconductor laser of another embodiment, in which FIG. 41A relates to a semiconductor laser (semiconductor laser array) for a black optical beam scanning device, and FIG. 41B relates to a semiconductor laser (semiconductor laser array) for yellow, magenta, cyan optical beam scanning devices.
Figure 41B:
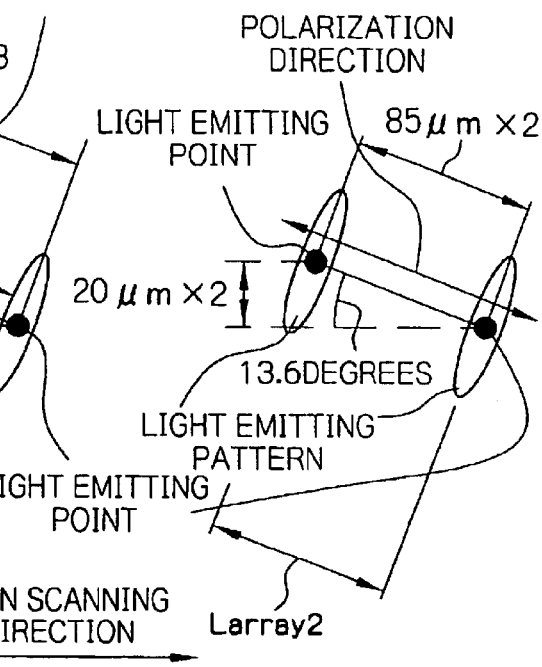

At the time, as shown in FIGS. 41A and 41B, the polarization direction of the light beam output from the light source for each color component is same. Moreover, even in the case the distance in the sub scanning direction of the light beam scanned by a polygon mirror surface and the light beam scanned by the next surface is same, the pitch in the sub scanning direction of each light beam can be even for each light beam.

In the example shown in FIGS. 41A and 41B, the pitch in sub-scanning direction between the light emitting points of the semiconductor laser arrays for yellow, magenta, cyan is set at 40 μm, that is, double the pitch in sub-scanning direction between the light emitting points of the semiconductor laser array for black 20 μm (=number of the light emitting points for black 4/number of the light emitting points of the others 2).

Moreover, according to a color optical beam scanning device, since the same lenses are used or the same lens is used commonly in designing the post-deflection optical system in general for preventing generation of color displacement, or the like, the sub scanning direction lateral magnification in the post-deflection optical system is same. Here, it is defined to be $\beta_{post}$. With the premise that the sub scanning direction lateral magnifications of the pre-deflection optical system for guiding to the deflector the light beams from a first semiconductor laser array and a second semiconductor laser array having different numbers of the light emitting points $N_{array1}$, $N_{array2}$, and intervals between the light emitting points $L_{ARRY1}$, $L_{ARRY2}$ (see FIGS. 41A and 41B) are $\beta_{pre1}$, $\beta_{pre2}$, and the absolute value of the angle of the line linking the light emitting points with respect to the main scanning direction is $\theta_{array}$ (it is the same absolute value for having the same polarization direction), the beam interval in the image plane (pitch in the sub scanning direction) can be each represented by the formulae (28) and (29).

$$\beta_{post} \times \beta_{pre1} \times L_{ARRY1} \times \sin(\theta_{array}) \tag{28}$$

$$\beta_{post} \times \beta_{pre2} \times L_{ARRY2} \times \sin(\theta_{array}) \tag{29}$$

In the case the number of rotations of the deflector is same, while producing scanning lines of the number of the light emitting points ($N_{array1}$) pieces by the first semiconductor array, the number of the light emitting points ($N_{array2}$) pieces are produced by the second semiconductor array so that if the pitch ratio in the sub scanning direction (the ratio of the formula (28) with respect to the formula (29)) is $N_{array2}/N_{array1}$, a latent image can be produced by the same speed in the sub scanning direction while effectively using all the light emitting points. It is needless to say that the condition is necessary at the time of forming a plurality of the scanning lines by one deflector, and the condition is extremely advantageous also at the time of restraining the position displacement in the main scanning direction by matching the rotation phase of each deflector (in the case of one deflector, of course the phase is matched), or by accurately matching the number of rotations (in the case of one deflector, of course the phase is matched) By rewiring the condition, the formula (30) can be obtained, and by putting the formula (30) in order for simplification, the formula (31) can be obtained.

$$N_{array1} \times \beta_{post} \times \beta_{pre1} \times L_{ARRY1} \times \sin(\theta_{array}) = N_{array2} \times \beta_{post} \times \beta_{pre2} \times L_{ARRY2} \times \sin(\theta_{array}) \tag{30}$$

$$N_{array1} \times \beta_{pre1} \times L_{ARRY1} = N_{array2} \times \beta_{pre2} \times L_{ARRY2} \tag{31}$$

That is, if the condition shown in the formula (31) is satisfied, the resolution of each color can be maximized while effectively utilizing each light source.

What is claimed is:

1. An optical beam scanning device for having a light beam with a width in a main scanning direction wider than the width in the main scanning direction of a reflection surface of a deflector incident on said deflector, reflecting and deflecting a part thereof by the reflection surface of said deflector, and focusing the deflected light beam on a surface to be scanned by an optical means including a transmission type optical member, wherein a polarization direction of the light beam incident on said deflector is substantially in the main scanning direction.

2. The optical beam scanning device according to claim 1, wherein the polarization direction of the light beam incident on said deflector has a larger P wave component, and a ratio of a deflector reflection surface length (2W)/an $e^{-2}$ diameter (2ω) on a deflector reflection surface satisfies a below-mentioned formula A):

$$\frac{W}{\omega} = \left(-15 + 60\cos^2\left(\frac{\pi}{NN}\right)\right) - \left[3\sqrt{5}\left\{2tg\pi r \times \gamma \times \cos\left(\frac{\pi}{NN}\right) + 3\gamma^2\cos^2\left(\frac{\pi}{NN}\right)\right\} - 80tg\pi r \times \gamma \times \cos^3\left(\frac{\pi}{NN}\right) + \right. \tag{A}$$

-continued $$40\gamma^2\cos^4\left(\frac{\pi}{NN}\right) + 288tgttr \times \gamma \times$$

$$\left.\cos^5\left(\frac{\pi}{NN}\right) - 208tgttr^2 \times \cos^6\left(\frac{\pi}{NN}\right)\right\}^{\frac{1}{2}} \times \sec\left(\frac{\pi}{NN}\right)\bigg]\bigg/\gamma\bigg\}^{\frac{1}{2}} \bigg/$$

$$\sqrt{2 - 80\cos^2\left(\frac{\pi}{NN}\right) + 288\cos^4\left(\frac{\pi}{NN}\right)}$$

in the formula (A), tgttr is a light amount irregularity restraining a target value between 0.9 and 1.1, NN is the number of the reflection surface of the deflector, and γ is the ratio of a transmissivity at a time of a polygon mirror angle 0 and the transmissivity at the time of a maximum polygon mirror angle ψmax between deflector and the surface to be scanned.

3. The optical beam scanning device according to claim 1, wherein the polarization direction of the light beam incident on said deflector has a larger P wave component, the ratio of the deflector reflection surface length (2W)/the $e^{-2}$ diameter (2ω) on the deflector reflection surface satisfies a below-mentioned formula (B), and an approximate value δ of the ratio of the transmissivity at the time of the polygon mirror angle 0 and the transmissivity at the time of the maximum polygon mirror angle ψmax between deflector and the surface to be scanned satisfies a below-mentioned formula (C):

$$\frac{W}{\omega} = \left(-15 + 60\cos^2\left(\frac{\pi}{NN}\right) - \left[3\sqrt{5}\,\{2tgttr \times \delta \times \right.\right. \tag{B}$$

$$\cos\left(\frac{\pi}{NN}\right) + 3\delta^2\cos^2\left(\frac{\pi}{NN}\right) - 80tgttr \times \delta \times \cos^3\left(\frac{\pi}{NN}\right) +$$

$$40\delta^2\cos^4\left(\frac{\pi}{NN}\right) + 288tgttr \times \delta \times$$

$$\left.\cos^5\left(\frac{\pi}{NN}\right) - 208tgttr^2 \times \cos^6\left(\frac{\pi}{NN}\right)\right\}^{\frac{1}{2}} \times \sec\left(\frac{\pi}{NN}\right)\bigg]\bigg/\delta\bigg\}^{\frac{1}{2}} \bigg/$$

$$\sqrt{2 - 80\cos^2\left(\frac{\pi}{NN}\right) + 288\cos^4\left(\frac{\pi}{NN}\right)}$$

$$\delta = \prod_{i=1}^{m} \frac{Tp, s(\psi max, n_i, \alpha)}{Tp, s(0, n_i)}$$

$$\frac{Tp, s(\psi max, n_i, \alpha)}{Tp, s(0, n_i)} =$$

$$\cos^2\alpha \times \frac{Tp(\psi max, n_i)}{Tp(0, n_i)} + \sin^2\alpha \times \frac{Ts(\psi max, n_i)}{Ts(0, n_i)}$$

$$\frac{Tp(\psi max, n_i)}{Tp(0, n_i)} = \frac{(1+n_i)^4\left(1 - \cot^2\left[\frac{2\pi}{NN} + \arcsin\left\{\frac{\sin\left(\frac{2\pi}{NN}\right)}{n_i}\right\}\right]\right)}{16n_i^2}$$

$$\frac{Ts(\psi max, n_i)}{Ts(0, n_i)} = \frac{Ts(\psi max, n_i)}{Ts(0, n_i)} = \tag{C}$$

$$\frac{(1+n_i)^4\left(1 - \csc^2\left[\frac{2\pi}{NN} + \arcsin\left\{\frac{\sin\left(\frac{2\pi}{NN}\right)}{n_i}\right\}\right]\right)}{16n_i^2}$$

in the formula (B), tgttr is a light amount irregularity restraining a target value between 0.9 and 1.1, NN is the number of the reflection surface of the deflector, and δ is the approximate value of the ratio of a transmissivity at a time of the polygon mirror angle 0 and the transmissivity at the time of the maximum polygon mirror angle ψmax between deflector and the surface to be scanned, in the formula (C), a is an angle of the polarization direction of the light beam incident on the reflection surface of the deflector with respect to the main scanning direction, and $n_i$ is a refractive index of the ith transmission type optical member between deflector and the surface to be scanned.

4. The optical beam scanning device according to claim 1, for executing half tone printing by a method of controlling emitting time of a light source in one pixel, or controlling a light amount, wherein the polarization direction of the light beam incident on said deflector has a larger P wave component, and a ratio of a deflector reflection surface length (2W)/an $e^{-2}$ diameter (2ω) on a deflector reflection surface satisfies a below-mentioned formula (D):

$$\frac{W}{\omega} = \left(-15 + 60\cos^2\left(\frac{\pi}{NN}\right) - \left[3\sqrt{5}\,\{2tgttr \times \gamma \times \right.\right. \tag{D}$$

$$\cos\left(\frac{\pi}{NN}\right) + 3\gamma^2\cos^2\left(\frac{\pi}{NN}\right) - 80tgttr \times \gamma \times \cos^3\left(\frac{\pi}{NN}\right) +$$

$$40\gamma^2\cos^4\left(\frac{\pi}{NN}\right) - 288tgttr \times \gamma \times \cos^5\left(\frac{\pi}{NN}\right) -$$

$$\left.208tgttr^2 \times \cos^6\left(\frac{\pi}{NN}\right)\right\}^{\frac{1}{2}} \times \sec\left(\frac{\pi}{NN}\right)\bigg]\bigg/\gamma\bigg\}^{\frac{1}{2}} \bigg/$$

$$\sqrt{2 - 80\cos^2\left(\frac{\pi}{NN}\right) + 288\cos^4\left(\frac{\pi}{NN}\right)}$$

in the formula (D), tgttr is a light amount irregularity restraining a target value between 0.95 and 1.05, NN is the number of the reflection surface of the deflector, and γ is the ratio of a transmissivity at a time of a polygon mirror angle 0 and the transmissivity at the time of a maximum polygon mirror angle ψmax between deflector and the surface to be scanned.

5. The optical beam scanning device according to claim 1, for executing half tone printing by a method of controlling emitting time of a light source in one pixel, or controlling a light amount, wherein the polarization direction of the light beam incident on said deflector has a larger P wave component, and a ratio of a deflector reflection surface length (2W)/an $e^{-2}$ diameter (2ω) on a deflector reflection surface satisfies a below-mentioned formulae (E):

$$\frac{W}{\omega} = \left(-15 + 60\cos^2\left(\frac{\pi}{NN}\right) - 3\sqrt{5}\left\{2tgttr \times \delta \times \cos\left(\frac{\pi}{NN}\right) + 3\delta^2\cos^2\left(\frac{\pi}{NN}\right) - 80tgttr \times \delta \times \cos^3\left(\frac{\pi}{NN}\right) + 40\delta^2\cos^4\left(\frac{\pi}{NN}\right) + 288tgttr \times \delta \times \cos^5\left(\frac{\pi}{NN}\right) - 208tgttr^2\cos^6\left(\frac{\pi}{NN}\right)\right\}^{\frac{1}{2}} \times \sec\left(\frac{\pi}{NN}\right)\right]/\delta\right)^{\frac{1}{2}}/ \sqrt{2 - 80\cos^2\left(\frac{\pi}{NN}\right) + 288\cos^4\left(\frac{\pi}{NN}\right)}$$ (E)

$$\delta = \prod_{i=1}^{m} \frac{Tp, s(\psi\max, n_i, \alpha)}{Tp, s(0, n_i)}$$

$$\frac{Tp, s(\psi\max, n_i, \alpha)}{Tp, s(0, n_i)} = \cos^2\alpha \times \frac{Tp(\psi\max, n_i)}{Tp(0, n_i)} + \sin^2\alpha \times \frac{Ts(\psi\max, n_i)}{Ts(0, n_i)}$$

$$\frac{Tp(\psi\max, n_i)}{Tp(0, n_i)} = \frac{(1+n_i)^4\left(1 - \cot^2\left[\frac{2\pi}{NN} + \arcsin\left\{\frac{\sin\left(\frac{2\pi}{NN}\right)}{n_i}\right\}\right]\right)\tan^2\left[\frac{2\pi}{NN} - \arcsin\left\{\frac{\sin\left(\frac{2\pi}{NN}\right)}{n_i}\right\}\right]\right)^2}{16n_i^2}$$

$$\frac{Ts(\psi\max, n_i)}{Ts(0, n_i)} = \frac{(1+n_i)^4\left(1 - \csc^2\left[\frac{2\pi}{NN} + \arcsin\left\{\frac{\sin\left(\frac{2\pi}{NN}\right)}{n_i}\right\}\right]\right)\sin^2\left[\frac{2\pi}{NN} - \arcsin\left\{\frac{\sin\left(\frac{2\pi}{NN}\right)}{n_i}\right\}\right]\right)^2}{16n_i^2}$$ (F)

in the formula (E), tgttr is a light amount irregularity restraining a target value between 0.95 and 1.05, NN is the number of the reflection surface of the deflector, and δ is a approximate value of the ratio of a transmissivity at a time of a polygon mirror angle 0 and the transmissivity at the time of a maximum polygon mirror angle ψmax between deflector and the surface to be scanned, represented by a formula (F), in the formula (F), α is an angle of the polarization direction of the light beam incident on the reflection surface of the deflector with respect to the main scanning direction, and $n_i$ is a refractive index of the ith transmission type optical member between deflector and the surface to be scanned.

6. The optical beam scanning device according to claim 1, wherein the polarization direction of the light beam output from the light source is substantially in the main scanning direction, and the polarization direction of the light beam incident on the deflector is substantially in the main scanning direction.

7. The optical beam scanning device according to claim 1, further including:
    an optical element for converting an output light beam from a light source to a parallel light beam or a light flux close to the parallel light beam;
    a cylindrical lens with a plane provided on an incident side, for focusing the output light beam from said optical element in vicinity of said deflector in a sub scanning direction; and
    a wave plate, or a birefringence substance to provide a function of the wave plate, provided on the plane of said cylindrical lens.

8. The optical beam scanning device according to claim 7, wherein a plurality of semiconductor lasers including one having different numbers of light emitting points are provided as the light sources for outputting the light beam to said deflector.

9. The optical beam scanning device according to claim 7, wherein the polarization direction of the light beam output from said light source is in the sub scanning direction with return developed in the case a return mirror is provided between said light source and said deflector, said wave plate or said birefringence substance to provide the function of said wave plate provides the function of a half wave plate, and said half wave plate is disposed such that a retarder principal plane of said half wave plate is inclined by an angle obtained by dividing in two the angle between the polarization direction of the light beam incident on said half wave plate and the main scanning direction.

10. The optical beam scanning device according to claim 1, wherein a polarizer is provided in an optical path between a light source and said deflector.

11. The optical beam scanning device according to claim 10, wherein a plurality of semiconductor lasers including one having different numbers of light emitting points are provided as the light sources for outputting the light beam to said deflector.

12. The optical beam scanning device according to claim 1, wherein a plurality of light sources are provided as the light sources for outputting the light beam to said deflector, with the polarization direction of the light beam incident on said deflector provided substantially in the main scanning direction.

13. The optical beam scanning device according to claim 12, wherein the plurality of the light sources are a plurality of semiconductor lasers including one having a different number of light emitting points.

\* \* \* \* \*

UNITED STATES PATENT AND TRADEMARK OFFICE
CERTIFICATE OF CORRECTION

PATENT NO. : 6,847,389 B2
DATED : January 25, 2005
INVENTOR(S) : Takeshi Shiraishi It is certified that error appears in the above-identified patent and that said Letters Patent is hereby corrected as shown below:

Column 38,
Line 19, change "(C), a is an" to -- (C), α is an --.

Column 39,
Lines 2-3, change "$-3\sqrt{5}\{2tgttr \times \delta \times \cos$" to -- $-[3\sqrt{5}\{2tgttr \times \delta \times \cos$ --.
Line 9, change "$208tgttr^2 \cos^6$" to -- $208tgttr^2 \times \cos^6$ --.

Signed and Sealed this

Seventh Day of June, 2005

JON W. DUDAS
*Director of the United States Patent and Trademark Office*